(12) United States Patent
Baptist et al.

(10) Patent No.: US 9,697,171 B2
(45) Date of Patent: Jul. 4, 2017

(54) MULTI-WRITER REVISION SYNCHRONIZATION IN A DISPERSED STORAGE NETWORK

(71) Applicant: CLEVERSAFE, INC., Chicago, IL (US)

(72) Inventors: Andrew Baptist, Mt. Pleasant, WI (US); Greg Dhuse, Chicago, IL (US); Ilya Volvovski, Chicago, IL (US); Jason K. Resch, Chicago, IL (US); Zachary J. Mark, Chicago, IL (US); Bart Cilfone, Chicago, IL (US)

(73) Assignee: INTERNAITONAL BUSINESS MACHINES CORPORATION, Armonk, NY (US)

( * ) Notice: Subject to any disclaimer, the term of this patent is extended or adjusted under 35 U.S.C. 154(b) by 144 days.

(21) Appl. No.: 14/335,915

(22) Filed: Jul. 20, 2014

(65) Prior Publication Data
US 2014/0330923 A1     Nov. 6, 2014

Related U.S. Application Data

(63) Continuation-in-part of application No. 12/954,232, filed on Nov. 24, 2010, now Pat. No. 8,819,179, (Continued)

(51) Int. Cl.
*G06F 15/16* (2006.01)
*G06F 15/173* (2006.01)
(Continued)

(52) U.S. Cl.
CPC .... *G06F 15/17331* (2013.01); *G06F 11/1076* (2013.01); *G06F 11/1443* (2013.01);
(Continued)

(58) Field of Classification Search
None
See application file for complete search history.

(56) References Cited

U.S. PATENT DOCUMENTS

| 4,092,732 A | 5/1978 | Ouchi |
| 5,416,808 A * | 5/1995 | Witsaman ................ G04G 7/02 375/356 |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Joshua Joo
*Assistant Examiner* — Younes Naji
(74) *Attorney, Agent, or Firm* — Garlick & Markison; Timothy W. Markison; Shayne X. Short

(57) ABSTRACT

A method begins by a processing module of a computing device receiving a most current revision value for a data element, where a revision value for the data element is generated based on a current time of a storing device. The method continues with the processing module generating a new revision value for a currently revised version of the data element based on a current time of the computing device and comparing the current time of the new revision value with the current time of the most current revision value. When the current time of the new revision value precedes the current time of the most current revision value, the method continues with the processing module adjusting the new revision value to produce an adjusted revision value and facilitating storage of the currently revised version of the data element having the adjusted revision value.

18 Claims, 26 Drawing Sheets

Related U.S. Application Data which is a continuation-in-part of application No. 12/797,025, filed on Jun. 9, 2010, now Pat. No. 8,595,435, and a continuation-in-part of application No. 11/973,542, filed on Oct. 9, 2007.

(60) Provisional application No. 61/230,038, filed on Jul. 30, 2009, provisional application No. 61/308,737, filed on Feb. 26, 2010.

(51) Int. Cl.
 *G06F 11/10* (2006.01)
 *G06F 11/14* (2006.01)
 *H04L 29/08* (2006.01)

(52) U.S. Cl.
 CPC .... *G06F 11/1474* (2013.01); *G06F 2201/835* (2013.01); *G06F 2211/1028* (2013.01); *H04L 67/1095* (2013.01); *H04L 67/1097* (2013.01)

(56) References Cited

U.S. PATENT DOCUMENTS

| | | |
|---|---|---|
| 5,454,101 A | 9/1995 | Mackay et al. |
| 5,485,474 A | 1/1996 | Rabin |
| 5,774,643 A | 6/1998 | Lubbers et al. |
| 5,802,364 A | 9/1998 | Senator et al. |
| 5,809,285 A | 9/1998 | Hilland |
| 5,890,156 A | 3/1999 | Rekieta et al. |
| 5,987,622 A | 11/1999 | Lo Verso et al. |
| 5,991,414 A | 11/1999 | Garay et al. |
| 6,012,159 A | 1/2000 | Fischer et al. |
| 6,058,454 A | 5/2000 | Gerlach et al. |
| 6,128,277 A | 10/2000 | Bruck et al. |
| 6,175,571 B1 | 1/2001 | Haddock et al. |
| 6,192,472 B1 | 2/2001 | Garay et al. |
| 6,256,688 B1 | 7/2001 | Suetaka et al. |
| 6,272,658 B1 | 8/2001 | Steele et al. |
| 6,301,604 B1 | 10/2001 | Nojima |
| 6,356,949 B1 | 3/2002 | Katsandres et al. |
| 6,366,995 B1 | 4/2002 | Vilkov et al. |
| 6,374,336 B1 | 4/2002 | Peters et al. |
| 6,415,373 B1 | 7/2002 | Peters et al. |
| 6,418,539 B1 | 7/2002 | Walker |
| 6,449,688 B1 | 9/2002 | Peters et al. |
| 6,567,948 B2 | 5/2003 | Steele et al. |
| 6,571,282 B1 | 5/2003 | Bowman-Amuah |
| 6,609,223 B1 | 8/2003 | Wolfgang |
| 6,718,361 B1 | 4/2004 | Basani et al. |
| 6,760,808 B2 | 7/2004 | Peters et al. |
| 6,785,768 B2 | 8/2004 | Peters et al. |
| 6,785,783 B2 | 8/2004 | Buckland |
| 6,826,711 B2 | 11/2004 | Moulton et al. |
| 6,879,596 B1 | 4/2005 | Dooply |
| 7,003,688 B1 | 2/2006 | Pittelkow et al. |
| 7,024,451 B2 | 4/2006 | Jorgenson |
| 7,024,609 B2 | 4/2006 | Wolfgang et al. |
| 7,080,101 B1 | 7/2006 | Watson et al. |
| 7,103,824 B2 | 9/2006 | Halford |
| 7,103,915 B2 | 9/2006 | Redlich et al. |
| 7,111,115 B2 | 9/2006 | Peters et al. |
| 7,140,044 B2 | 11/2006 | Redlich et al. |
| 7,146,644 B2 | 12/2006 | Redlich et al. |
| 7,171,493 B2 | 1/2007 | Shu et al. |
| 7,222,133 B1 | 5/2007 | Raipurkar et al. |
| 7,240,236 B2 | 7/2007 | Cutts et al. |
| 7,272,613 B2 | 9/2007 | Sim et al. |
| 7,636,724 B2 | 12/2009 | de la Torre et al. |
| 7,865,497 B1* | 1/2011 | Pillai ............. G06F 17/30864 707/709 |
| 2002/0062422 A1 | 5/2002 | Butterworth et al. |
| 2002/0166079 A1 | 11/2002 | Ulrich et al. |
| 2003/0018927 A1 | 1/2003 | Gadir et al. |
| 2003/0037261 A1 | 2/2003 | Meffert et al. |
| 2003/0065617 A1 | 4/2003 | Watkins et al. |
| 2003/0084020 A1 | 5/2003 | Shu |
| 2004/0024963 A1 | 2/2004 | Talagala et al. |
| 2004/0122917 A1 | 6/2004 | Menon et al. |
| 2004/0151244 A1* | 8/2004 | Kim .................. H04N 19/70 375/240.03 |
| 2004/0215998 A1 | 10/2004 | Buxton et al. |
| 2004/0228493 A1 | 11/2004 | Ma et al. |
| 2005/0100022 A1 | 5/2005 | Ramprashad |
| 2005/0114594 A1 | 5/2005 | Corbett et al. |
| 2005/0125593 A1 | 6/2005 | Karpoff et al. |
| 2005/0131993 A1 | 6/2005 | Fatula, Jr. |
| 2005/0132070 A1 | 6/2005 | Redlich et al. |
| 2005/0144382 A1 | 6/2005 | Schmisseur |
| 2005/0229069 A1 | 10/2005 | Hassner |
| 2006/0047907 A1 | 3/2006 | Shiga et al. |
| 2006/0070019 A1* | 3/2006 | Vishnumurty .... G06F 17/30289 717/101 |
| 2006/0136448 A1 | 6/2006 | Cialini et al. |
| 2006/0156059 A1 | 7/2006 | Kitamura |
| 2006/0224603 A1 | 10/2006 | Correll, Jr. |
| 2007/0079081 A1 | 4/2007 | Gladwin et al. |
| 2007/0079082 A1 | 4/2007 | Gladwin et al. |
| 2007/0079083 A1 | 4/2007 | Gladwin et al. |
| 2007/0088970 A1 | 4/2007 | Buxton et al. |
| 2007/0174192 A1 | 7/2007 | Gladwin et al. |
| 2007/0214285 A1 | 9/2007 | Au et al. |
| 2007/0234110 A1 | 10/2007 | Soran et al. |
| 2007/0283167 A1 | 12/2007 | Venters, III et al. |
| 2009/0094251 A1 | 4/2009 | Gladwin et al. |
| 2009/0094318 A1 | 4/2009 | Gladwin et al. |
| 2010/0023524 A1 | 1/2010 | Gladwin et al. |
| 2010/0169286 A1* | 7/2010 | Hackworth ....... G06F 17/30899 707/689 |
| 2011/0113340 A1* | 5/2011 | Miyazawa ............ G06F 9/445 715/736 |
| 2011/0289052 A1* | 11/2011 | Rambacher ....... G06F 17/30575 707/624 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

(56) References Cited

OTHER PUBLICATIONS

Zeilenga; Lightweight Directory Access Protocol (LDAP): String Representation of Distinguished Names; IETF Network Working Group; RFC 4514; Jun. 2006; pp. 1-15.
Sermersheim; Lightweight Directory Access Protocol (LDAP): The Protocol; IETF Network Working Group; RFC 4511; Jun. 2006; pp. 1-68.
Satran, et al.; Internet Small Computer Systems Interface (iSCSI); IETF Network Working Group; RFC 3720; Apr. 2004; pp. 1-257.
Xin, et al.; Evaluation of Distributed Recovery in Large-Scale Storage Systems; 13th IEEE International Symposium on High Performance Distributed Computing; Jun. 2004; pp. 172-181.
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

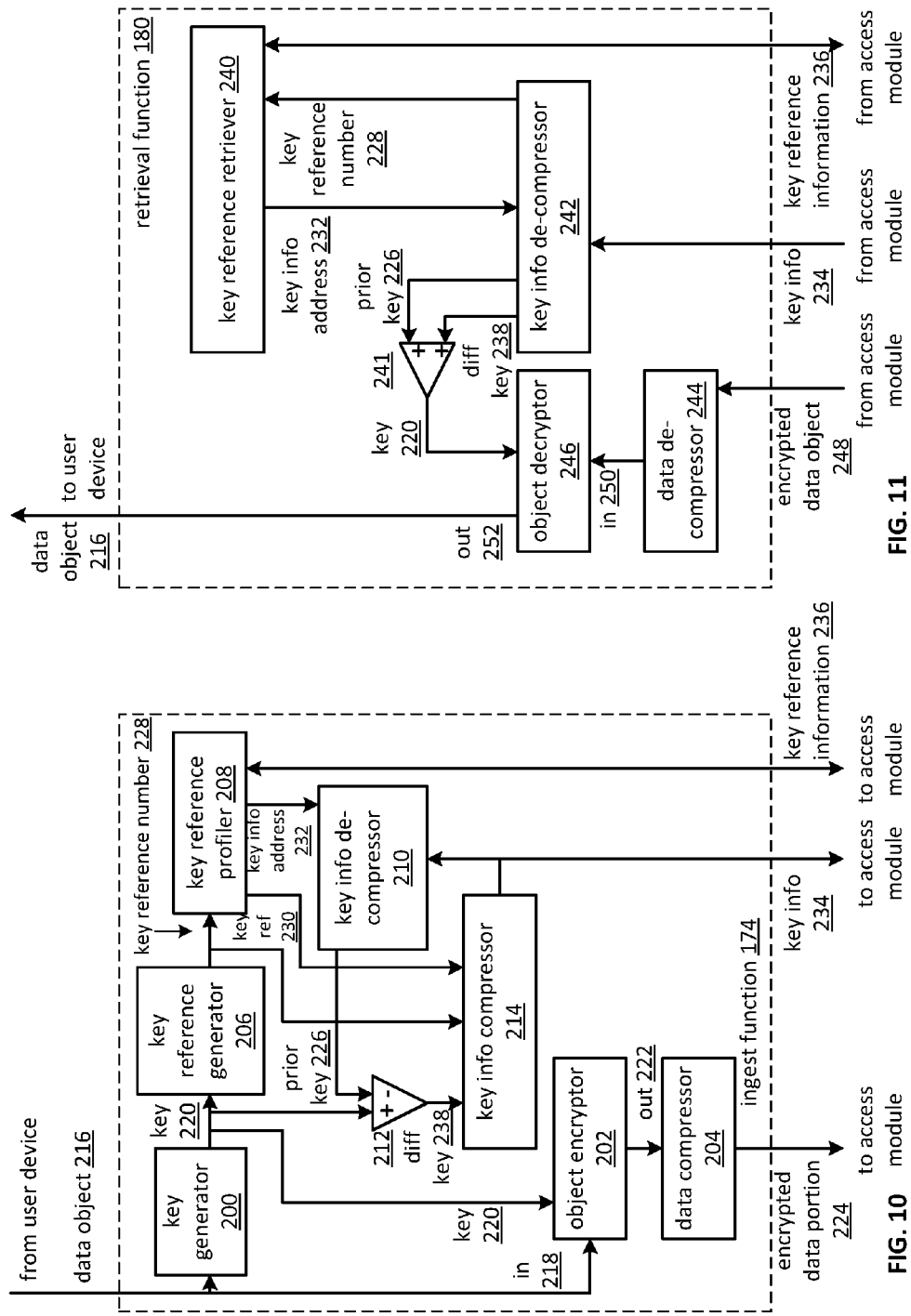

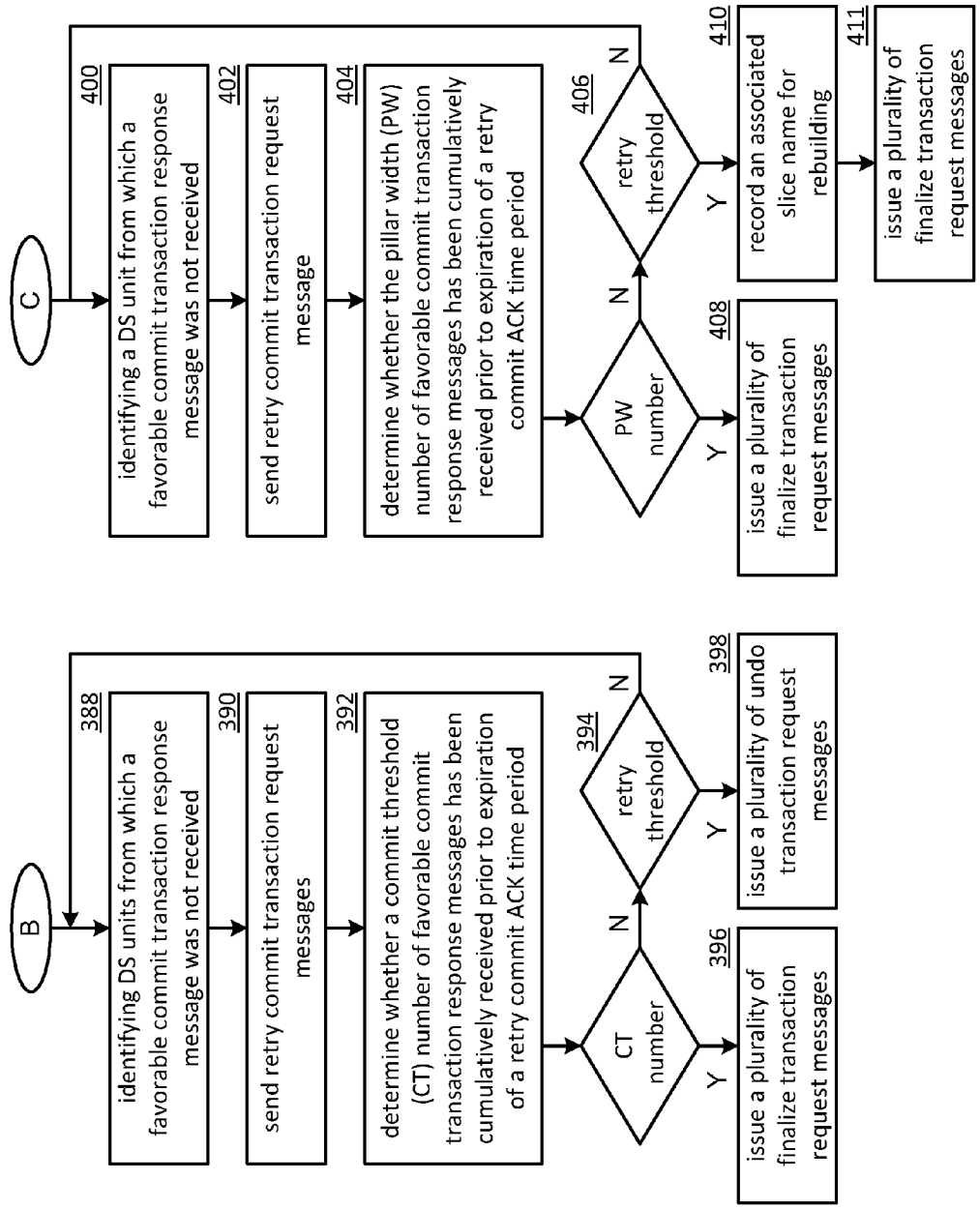

MULTI-WRITER REVISION SYNCHRONIZATION IN A DISPERSED STORAGE NETWORK

CROSS REFERENCE TO RELATED PATENTS

The present U.S. Utility patent application claims priority pursuant to 35 U.S.C. §120 as a continuation-in-part of U.S. Utility application Ser. No. 12/954,232, entitled "DATA REVISION SYNCHRONIZATION IN A DISPERSED STORAGE NETWORK," filed Nov. 24, 2010, pending, which is a continuation-in-part of U.S. Utility application Ser. No. 12/797,025, entitled "DISPERSED STORAGE WRITE PROCESS," filed Jun. 9, 2010, issued as U.S. Pat. No. 8,595,435 on Nov. 26, 2013, which claims priority pursuant to 35 U.S.C. §119(e) to U.S. Provisional Application No. 61/230,038, entitled "DISPERSED STORAGE NETWORK VERSION SYNCHRONIZATION," filed Jul. 30, 2009, all of which are incorporated herein by reference in their entirety and made part of the present U.S. Utility patent application for all purposes.

U.S. Utility application Ser. No. 12/954,232 claims priority pursuant to 35 U.S.C. §120, as a continuation-in-part of U.S. Utility application Ser. No. 11/973,542, entitled "ENSURING DATA INTEGRITY ON A DISPERSED STORAGE GRID," filed Oct. 9, 2007, pending, and U.S. Utility application Ser. No. 12/954,232 also claims priority pursuant to 35 U.S.C. §119(e) to U.S. Provisional Application No. 61/308,737, entitled "DISTRIBUTED STORAGE DATA REVISIONS MANAGEMENT," filed Feb. 26, 2010, all of which are incorporated herein by reference in their entirety and made part of the present U.S. Utility patent application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computing systems and more particularly to data storage solutions within such computing systems.

Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to utilize a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 10 is a schematic block diagram of an embodiment of an ingest function in accordance with the present invention;

FIG. 11 is a schematic block diagram of an embodiment of a retrieval function in accordance with the present invention;

FIG. 15F is another flowchart illustrating another example of storing data in accordance with the present invention;

FIG. 15G is another flowchart illustrating another example of storing data in accordance with the present invention;

DETAILED DESCRIPTION OF THE INVENTION

Figure 1:
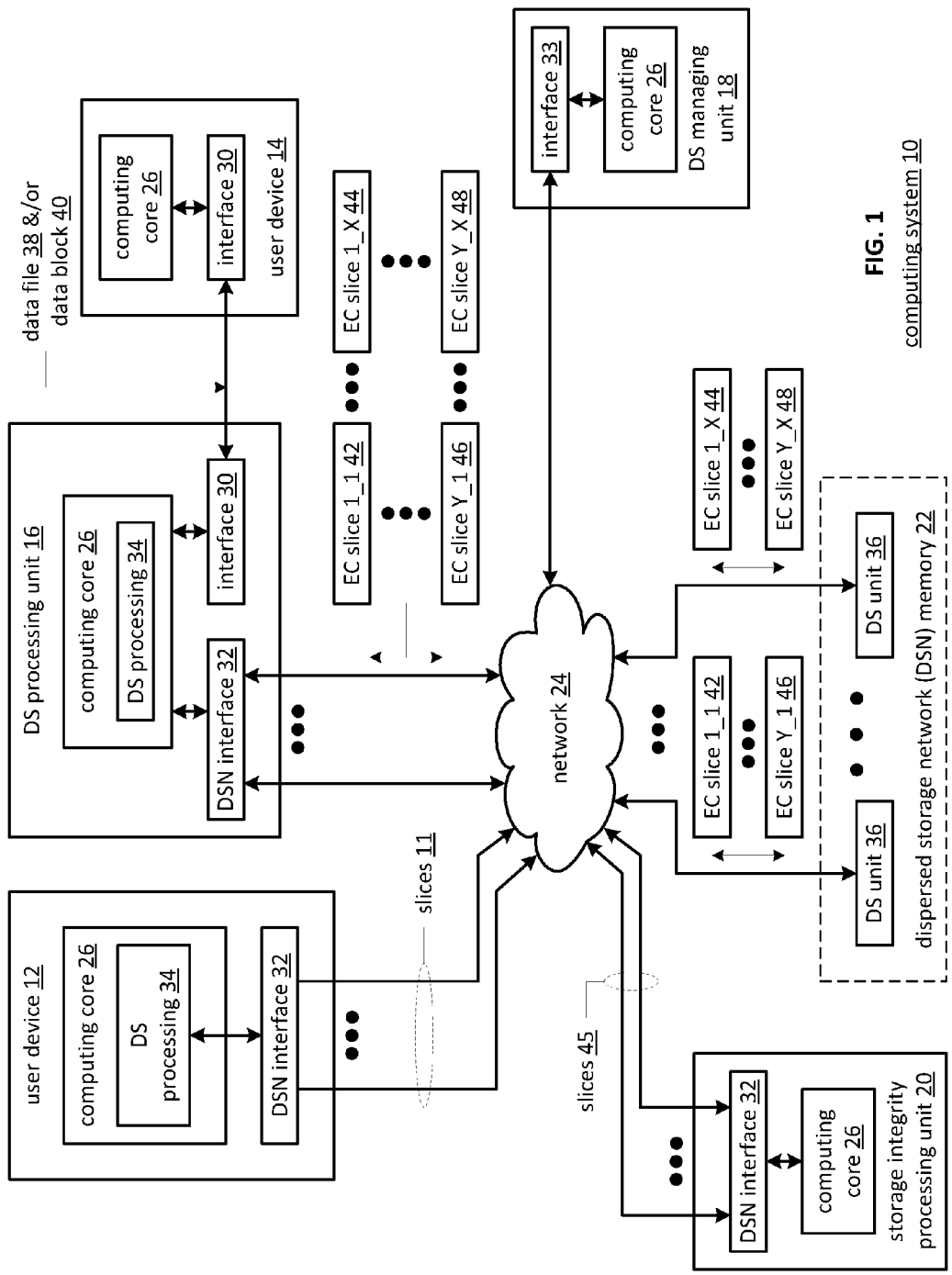
FIG. 1 is a schematic block diagram of an embodiment of a computing system in accordance with the present invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.). The processing module may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module may have an associated memory and/or memory element, which may be a single memory device, a plurality of memory devices, and/or embedded circuitry of the processing module. Such a memory device may be a read-only memory, random access memory, volatile memory, non-volatile memory, static memory, dynamic memory, flash memory, cache memory, and/or any device that stores digital information. Note that if the processing module includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module executes, hard coded and/or operational instructions corresponding to at least some of the steps and/or functions illustrated in FIGS. 1-21.

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interface 30 supports a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing unit 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times a user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices' and/or units' activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it sends the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment (e.g., data slices 42 through 44 of a first data segment through data slices 46 through 48 of a Yth data segment). The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each EC slice 42-48, the DS processing unit 16 creates a unique slice name and appends it to the corresponding EC slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the EC slices 42-48 for transmission via the network 24.

The number of DS units 36 receiving the EC slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improve data storage integrity and security. Further examples of encoding the data segments will be provided with reference to one or more of FIGS. 2-12.

Each DS unit 36 that receives an EC slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuilt slice, or slices, in the appropriate DS unit(s) 36 in a manner that mimics the write process previously described.

Figure 2:
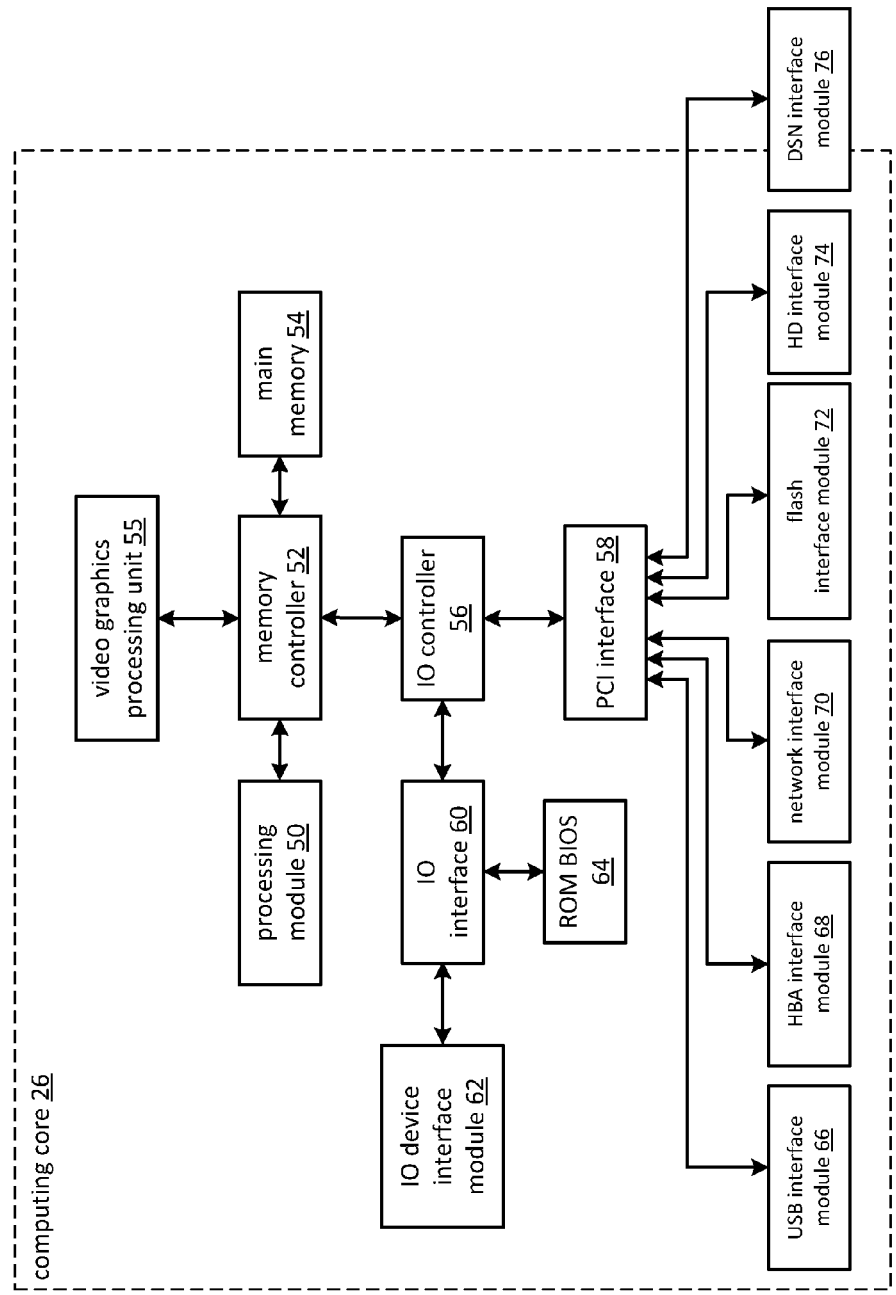
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface 60, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

The processing module 50 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module 50 may have an associated memory and/or memory element, which may be a single memory device, a plurality of memory devices, and/or embedded circuitry of the processing module 50. Such a memory device may be a read-only memory, random access memory, volatile memory, non-volatile memory, static memory, dynamic memory, flash memory, cache memory, and/or any device that stores digital information. Note that if the processing module 50 includes more than one processing device, the processing devices may be centrally located (e.g., directly coupled together via a wired and/or wireless bus structure) or may be distributedly located (e.g., cloud computing via indirect coupling via a local area network and/or a wide area network). Further note that when the processing module 50 implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element stores, and the processing module 50 executes, hard coded and/or operational instructions corresponding to at least some of the steps and/or functions illustrated in FIGS. 1-21.

Figure 3:
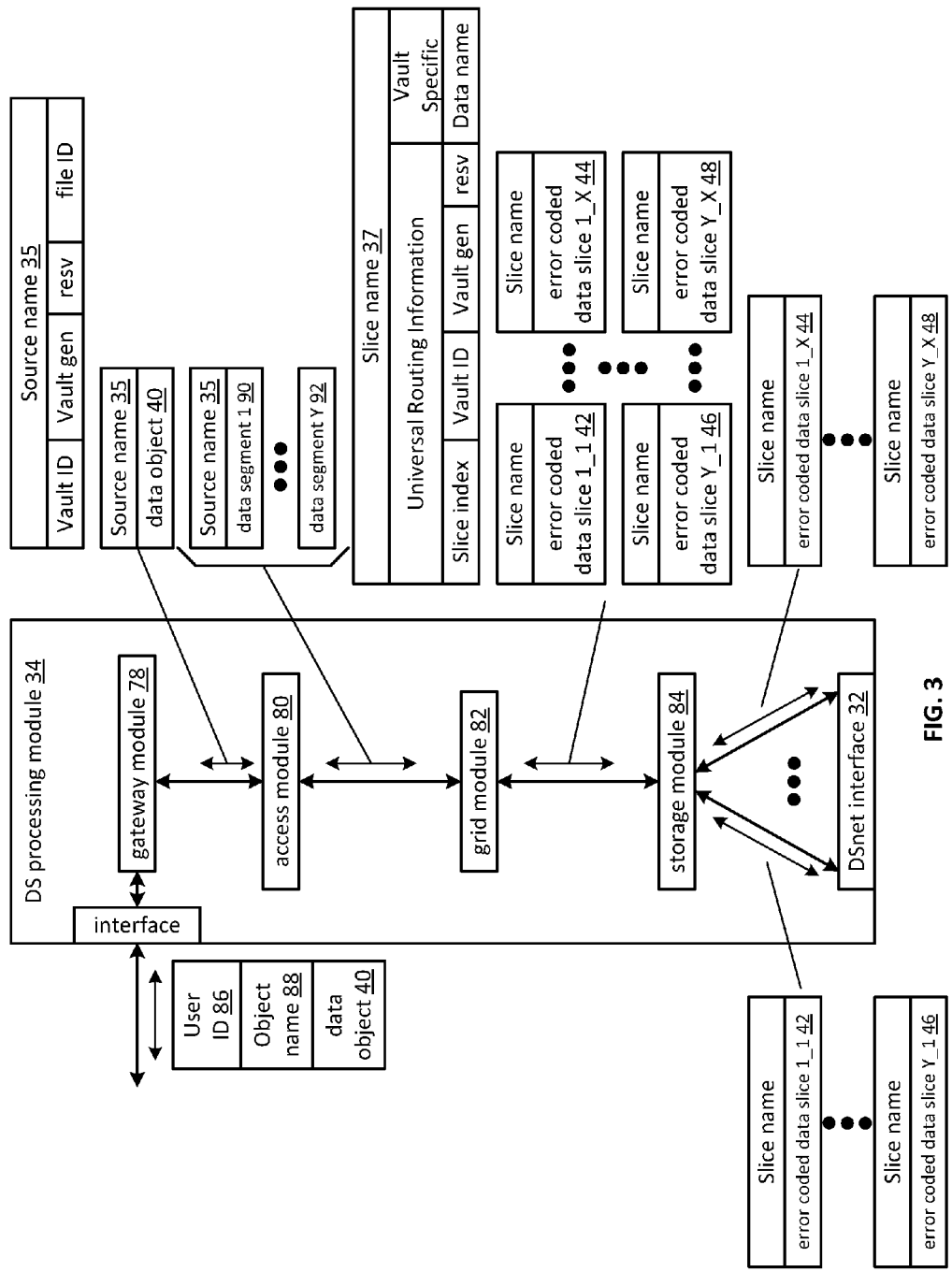
FIG. 3 is a schematic block diagram of an embodiment of a distributed storage processing unit in accordance with the present invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user device 12 or of the DS processing unit 16. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data object field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the DS managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 78 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment size is fixed, then the number of segments Y varies based on the size of data object. For instance, if the data object is an image file of 4,194,304 bytes and the fixed size of each segment is 4,096 bytes, then the number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X−T (e.g., 16−10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 14, which authenticates the request. When the request is authentic, the DS processing unit 14 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

Figures 4, 5:
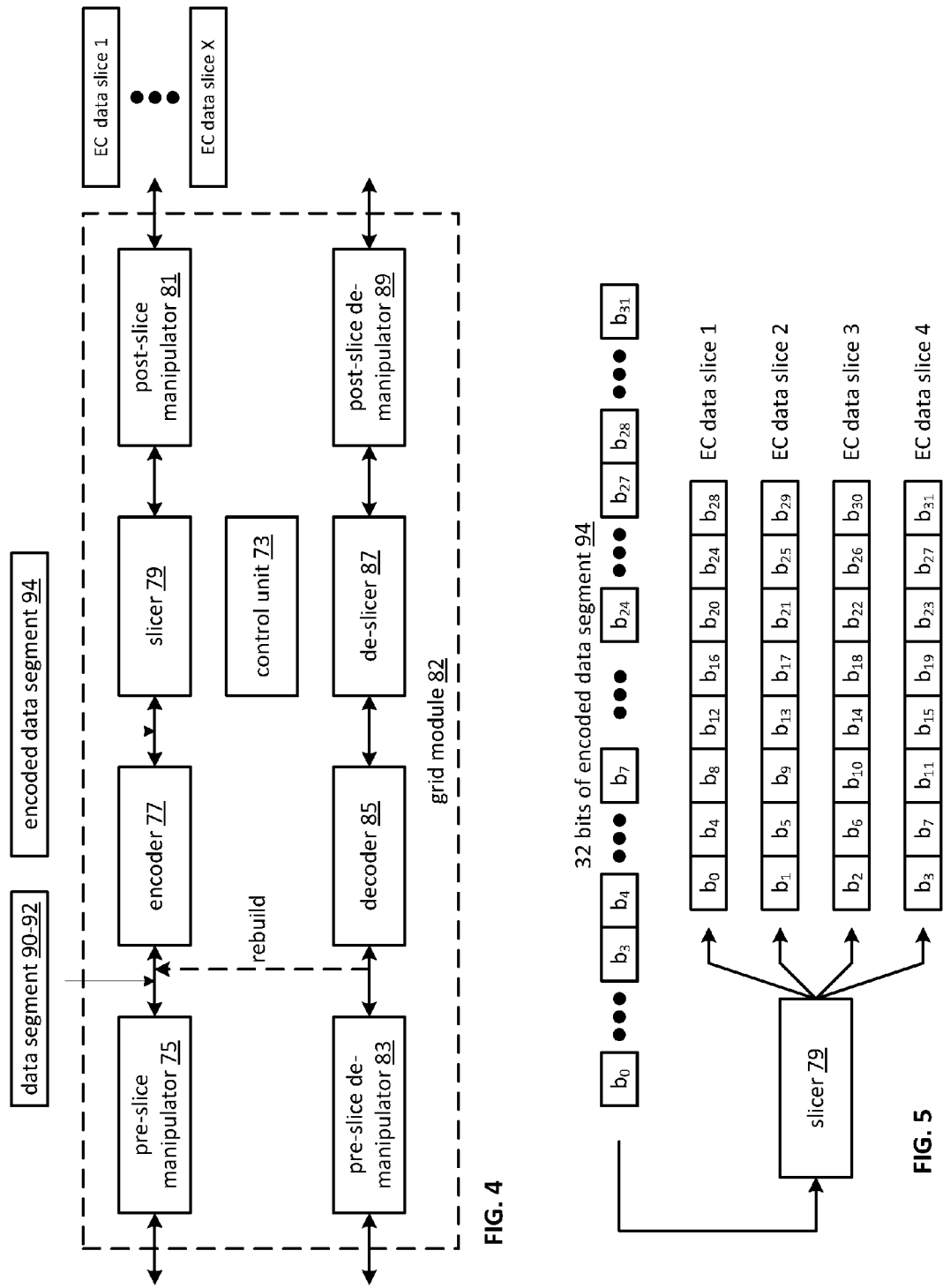
FIG. 4 is a schematic block diagram of an embodiment of a grid module in accordance with the present invention.
FIG. 5 is a diagram of an example embodiment of error coded data slice creation in accordance with the present invention.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of a write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X-T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6:
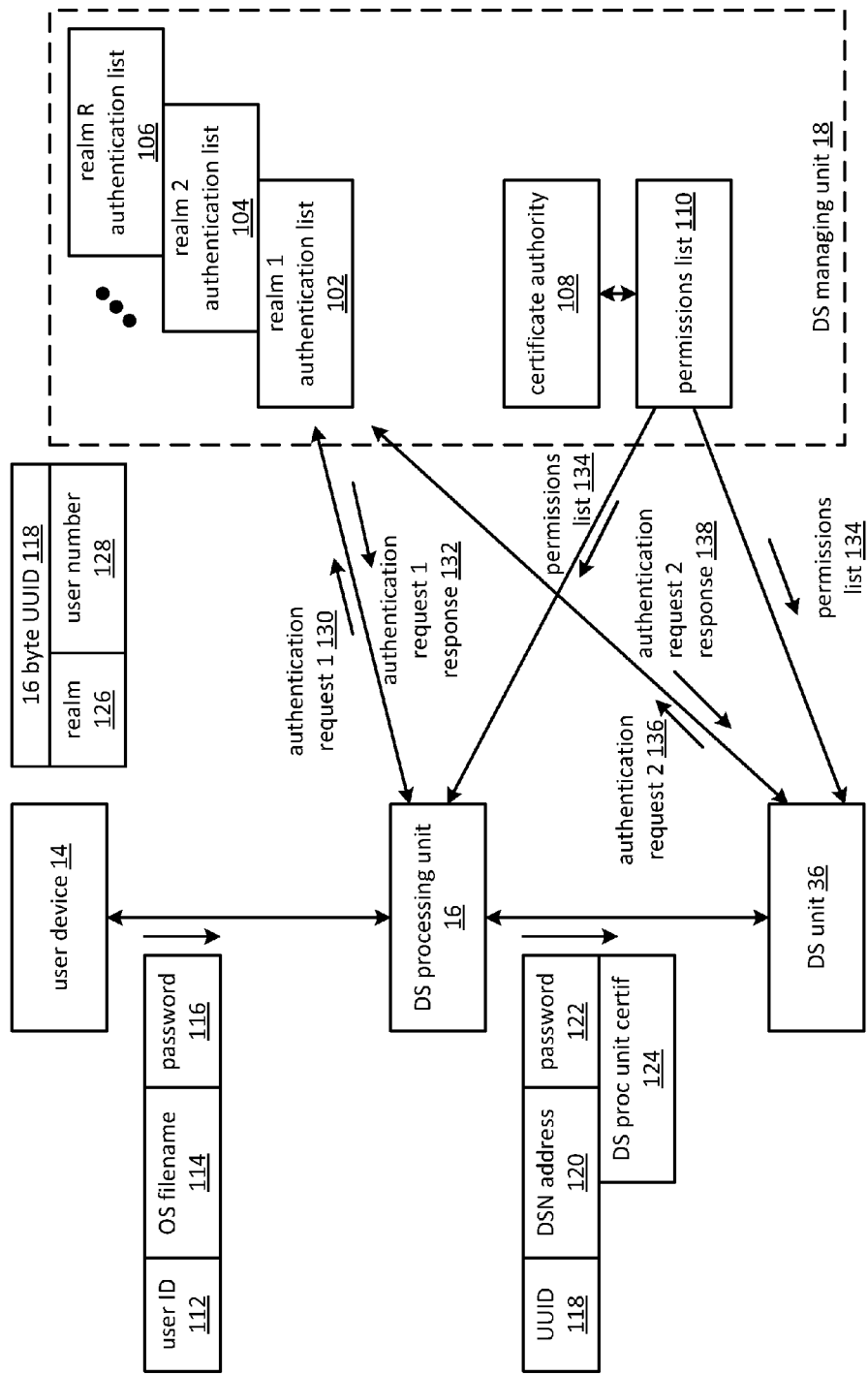
FIG. 6 is another schematic block diagram of another embodiment of a computing system in accordance with the present invention.

FIG. 6 is a schematic block diagram of another embodiment of a computing system that includes a user device 14, a dispersed storage (DS) processing unit 16, a DS unit 36, and a DS managing unit 18. The DS managing unit 18 includes a permissions list 110, a certificate authority 108, and one or more authentications lists 102-106, which may be organized as realm 1 authentication list 102 through realm R authentication list 106.

The permissions list 110 includes an access control list (ACL) containing a list of functions by dispersed storage network (DSN) addresses that users have permission to perform. Each entry in the ACL is indexed by a universal user identifier (UUID) 118, which is assigned to a computing system user and includes a realm part 126 and a user number part 128. The user number 128 is assigned as a random number and will be associated with the same user. The realm 126 specifies different portions of the DSN (e.g., different DSN providers or user groups) that a user is affiliated with and utilizes a different authentication list for each realm.

The certificate authority (CA) 108 provides a trusted third party portion of a public key infrastructure (PKI) scheme. In this instance, the CA 108 receives a certificate signing request (CSR) from a system element where the CSR may be based, in part, on the user ID 112 and a public key (e.g., paired to a secret private key generated and stored locally by a requester). The authentication list 102-106 uses a lightweight directory access protocol (LDAP) format to store UUID information (e.g., UUID, user ID, name, organization, address, email, phone, billing information) for valid authorized users of the computing system.

In an example of operation, the user device 14 sends a read request to the DS processing unit 16 using a network connection that may include a virtual private network (VPN) over the internet, a protocol including hypertext transfer protocol secure (HTTPS), and/or a common internet file system (CIFS). The read request includes the user ID 112, an operating system (OS) filename 114, and a password 116. Note that the password 116 may comprise a hash of a user device private key and a text string password as entered by a user of the user device 14.

The DS processing unit 16 determines a universal user identifier (UUID) 118 for the user device 14 based on the user ID and an entry of the permissions list 110. To access the permissions list, the DS processing unit 16 may retrieve it from local memory or may request it from another system element (e.g., the DS managing unit 18). If the DS processing unit 16 requests the permission list request, the request may be based on a private key associated with the DS processing unit 16 and a signed certificate from the certificate authority 108.

Next, the DS processing unit 16 sends a first authentication request 130 to the DS managing unit 18, where the first authentication request 130 includes the UUID 118 (including the realm to direct the request to the proper authentication list when there are more than one), a public key associated with the DS processing 16, and the signed certificate from the certificate authority 108. Next, the DS managing unit 18 sends a first authentication request response 132 to the DS processing unit 16. The response may indicate a favorable condition when the DS managing unit 18 verifies that the certificate and UUID are valid and that the user is authorized to access at least a portion of the DSN. The response may indicate an unfavorable condition when the DS managing unit 18 does not authenticate the request.

The DS processing unit 16 receives the first authentication request response 132 and verifies that the user request matches allowed permissions by comparing the request with the allowed operations specified in the permissions list 134. For example, the permissions may indicate that the user may only read data in a particular folder or file. In another example, the permissions list may indicate that the user may read, write, delete, update, etc. data in a particular folder or file. Note that the DS processing unit 16 is acting as a proxy for the user device 14 and, as such, is a trusted system element in this capacity.

When the user request was not verified, the DS processing unit 16 sends an error message to one or more system elements (e.g., the user device and/or DS managing unit 18). When, however, the user request has been verified, the DS processing unit 16 determines a virtual DSN address of a requested data object based on the OS filename 114 and user vault information. The DS processing unit 16 then sends read requests to the DS unit 36 that contain slice names corresponding to encoded data slices for the request data object based on the virtual DSN address and the DSN locations indicated by a virtual DSN address to physical locations table. Such a read request may include the UUID 118, the DSN address 120, the password 122, and the certificate 124 based on the DS processing unit private key and the signed certificate from the certificate authority 108.

Upon receiving the read request from the DS processing unit 16, the DS unit 36 access the permissions list 110 (e.g., local copy or from a system element) to begin its verification process. In this regard, the DS unit 36 sends a second authentication request 136 to the DS managing unit 18, where the second request includes the UUID 118 (including the realm to direct the request to the proper authentication list when there is more than one), a DS unit public key, and the signed certificate from the certificate authority 108. The DS managing unit 18 processes the second request to produce a second authentication response 138 and sends it to the DS unit 36. The response may be favorable when the DS managing unit 18 verifies that the certificate and UUID are valid and that the user device 14 is authorized to access at least a portion of the DSN. The response may be unfavorable when the DS managing unit 18 does not authenticate the request.

Upon receiving the second authentication request response 138, the DS unit 36 verifies that the user request substantially matches the allowed permissions by verifying the request against the permissions list as previously discussed. Note that the DS unit 36 is acting as a proxy for the user device 14 to verify that one or all of the user device 14, the DS processing unit 16, and the DS unit 36 is allowed to perform tasks associated with the request from the user device 14 on behalf of the user device 14. As such, the DS unit 36 may authenticate and verify permissions for each of the user device 14 and the DS processing unit 16. Further note, that the DS unit 36 may be required to be a trusted system element to gain approval to carry out the system and user tasks.

After verifying the request, the DS unit 36 retrieves an encoded data slice for the virtual DSN address of the requested data object based on a local DS unit virtual DSN address to DS unit memory device table lookup. The DS unit 36 sends the encoded data slice to the DS processing unit 16, which dispersed storage decodes the encoded data slice and other encoded data slices to produce a data object. The DS unit 36 then sends the data object to the user device 14. Note that the DS unit 36 sends an error message to one or more system elements (e.g., the user device 14 and/or DS managing unit 18) when the authentication and/or permissions check are unfavorable.

Figure 7:
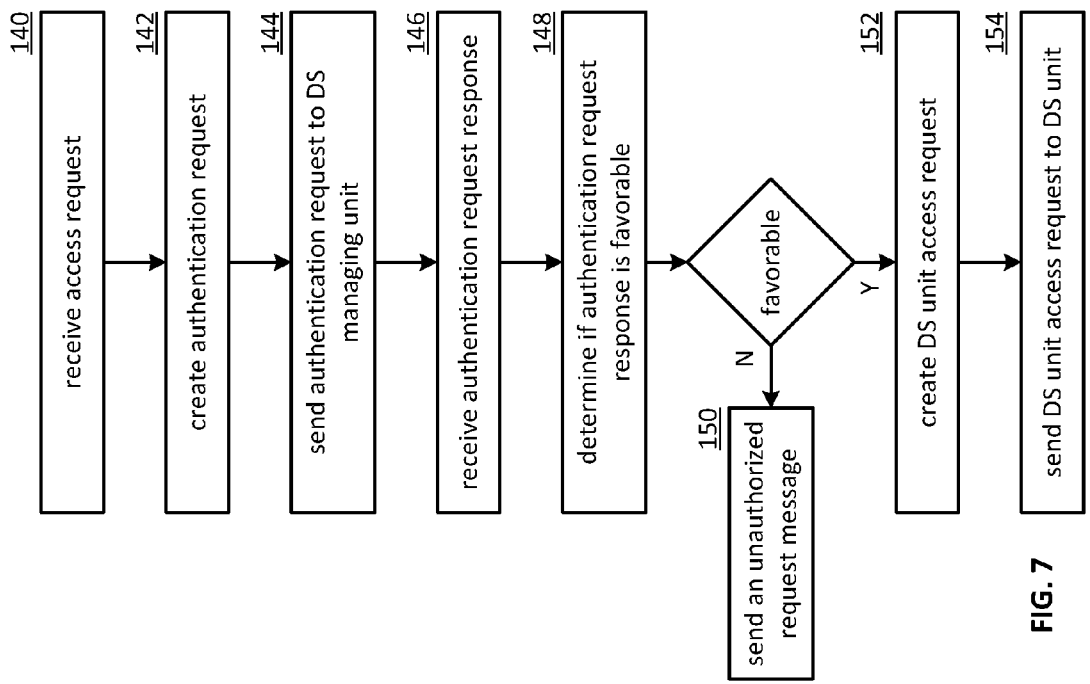
FIG. 7 is a flowchart illustrating an example of authenticating an access request in accordance with the present invention.

FIG. 7 is a flowchart illustrating an example of authenticating an access request. The method begins with step 140 where a processing module receives an access request from one of a user device, a dispersed storage (DS) processing unit, a DS managing unit, a storage integrity processing unit, and a DS unit. The access request includes one or more of a user identifier (ID), a password, a request, a data object ID, a data object, a data type, a priority indicator, a performance indicator, and a security indicator.

The method continues at step 142 where the processing module creates an authentication request based on the access request. Such an authentication request may include one or more of a user ID, a password, a request, a DS processing unit ID, a DS processing unit security certificate, a data object ID, a data object, a data type, a priority indicator, a performance indicator, and a security indicator. The method continues at step 144 where the processing module sends the authentication request to a DS managing unit, which compares the authentication request to a permissions list to validate the request and verify the request. For example, the DS managing unit responds with an authentication request response that is favorable when it determines that the authentication request is valid and the access request is to be granted. In another example, the DS managing unit responds with an authentication request response as unfavorable when it determines that the authentication request is either invalid and/or access request is not to be granted.

The method continues at step 146 where the processing module receives the authentication request response. The method continues at step 148 where the processing module determines whether the authentication request response is favorable based on the contents of the response. For example, the processing module determines that the authentication request response is favorable when the response indicates that the access request is approved. In another example, the processing module determines that the authentication request response is not favorable when the response indicates that the access request is not approved (e.g., denied).

When the authentication request response is not favorable, the method continues at step 150 where the processing module sends an unauthorized request message. Note that the processing module may send the unauthorized request message to one or more of a user device, a DS processing unit, a DS managing unit, a storage integrity processing unit, and a DS unit. Further note, the unauthorized request message may include an unauthorized status indicator and at least a portion of information from the authentication request.

When the authentication request response is favorable, the method continues at step 152 where the processing module creates a DS unit access request, which includes one or more of a DS processing unit ID, a DS processing unit security certificate, a source name, a slice name, a user ID, a password, a request, a data object ID, a data object, a data type, a priority indicator, a performance indicator, and a security indicator. The method continues at step 154 where the processing module determines a DS unit that is storing an encoded data slice of the data object identified in the access request. Such a determination is based on one or more of the user ID, the data object name, a vault lookup, a data type, a priority indicator, a performance indicator, and a security indicator. The method continues at step 154 where the processing module sends the DS unit access request to the DS unit.

Figure 8:
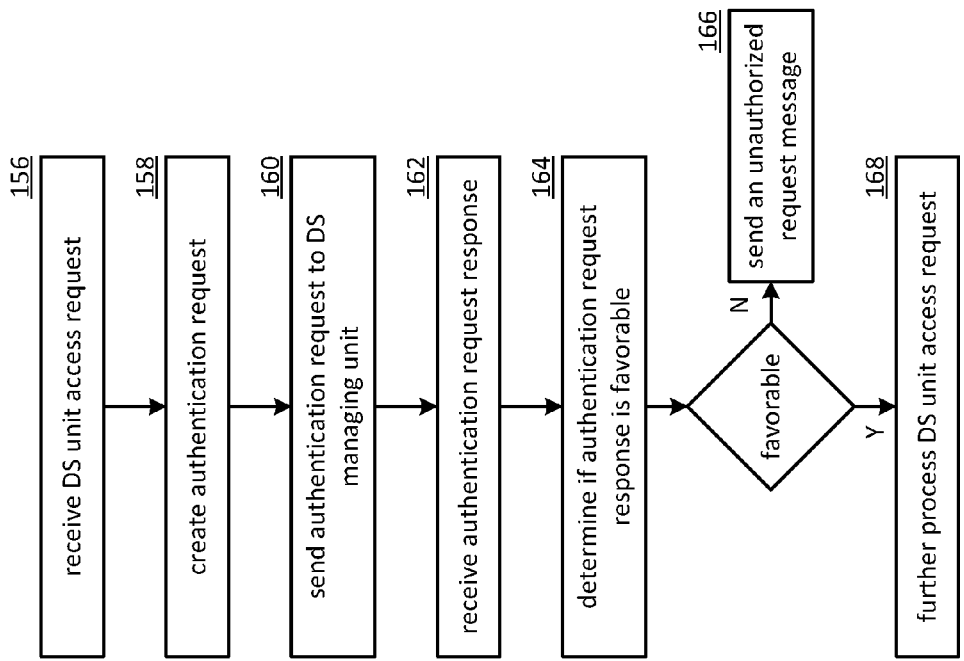
FIG. 8 is another flowchart illustrating another example of authenticating an access request in accordance with the present invention.

FIG. 8 is another flowchart illustrating another example of authenticating an access request that may be performed by a DS unit. The method begins at step 156 where a processing module of the DS unit receives a dispersed storage (DS) unit access request. The DS unit access request includes one or more of a DS processing unit ID, a DS processing unit security certificate, a source name, a slice name, a user ID, a password, a request, a data object ID, a data object, a data type, a priority indicator, a performance indicator, and a security indicator.

The method continues at step 158 where the processing module creates an authentication request based on the DS unit access request. Such an authentication request includes one or more of a user ID, a password, a request, a DS unit ID, a DS unit security certificate, a data object ID, a data object, a data type, a priority indicator, a performance indicator, and a security indicator. The method continues at step 160 where the processing module sends the authentication request to a DS managing unit, which compares the authentication request to a permissions list to validate the request and verify the request. For example, the DS managing unit responds with an authentication request response that is favorable when the DS managing unit determines that the authentication request is valid and the DS unit access request is to be granted. In another example, the DS managing unit responds with an authentication request response as unfavorable when the DS managing unit determines that the authentication request is either invalid and/or the DS unit access request is not to be granted.

The method continues at step 162 where the processing module receives the authentication request response. The method continues at step 164 where the processing module determines whether the authentication request response is favorable based on the contents of the response as previously discussed. When the authentication request response is not favorable, the method continues at step 166 where the processing module sends an unauthorized request message, which may include the unauthorized status and at least a portion of the information from the authentication request.

When the authentication request response is favorable, the method continues at step 168 where the processing module further processes the authenticated DS unit access request. Such further processing may include one or more of retrieving slices, storing slices, deleting slices, checking on the status of slices, and any other request to the DS unit. Note that the methods discussed in FIG. 7 and FIG. 8 are typically performed in tandem to authenticate the DS unit access request at least twice, which adds to the level of security provided by dispersed storage network (DSN) memory.

Figure 9:
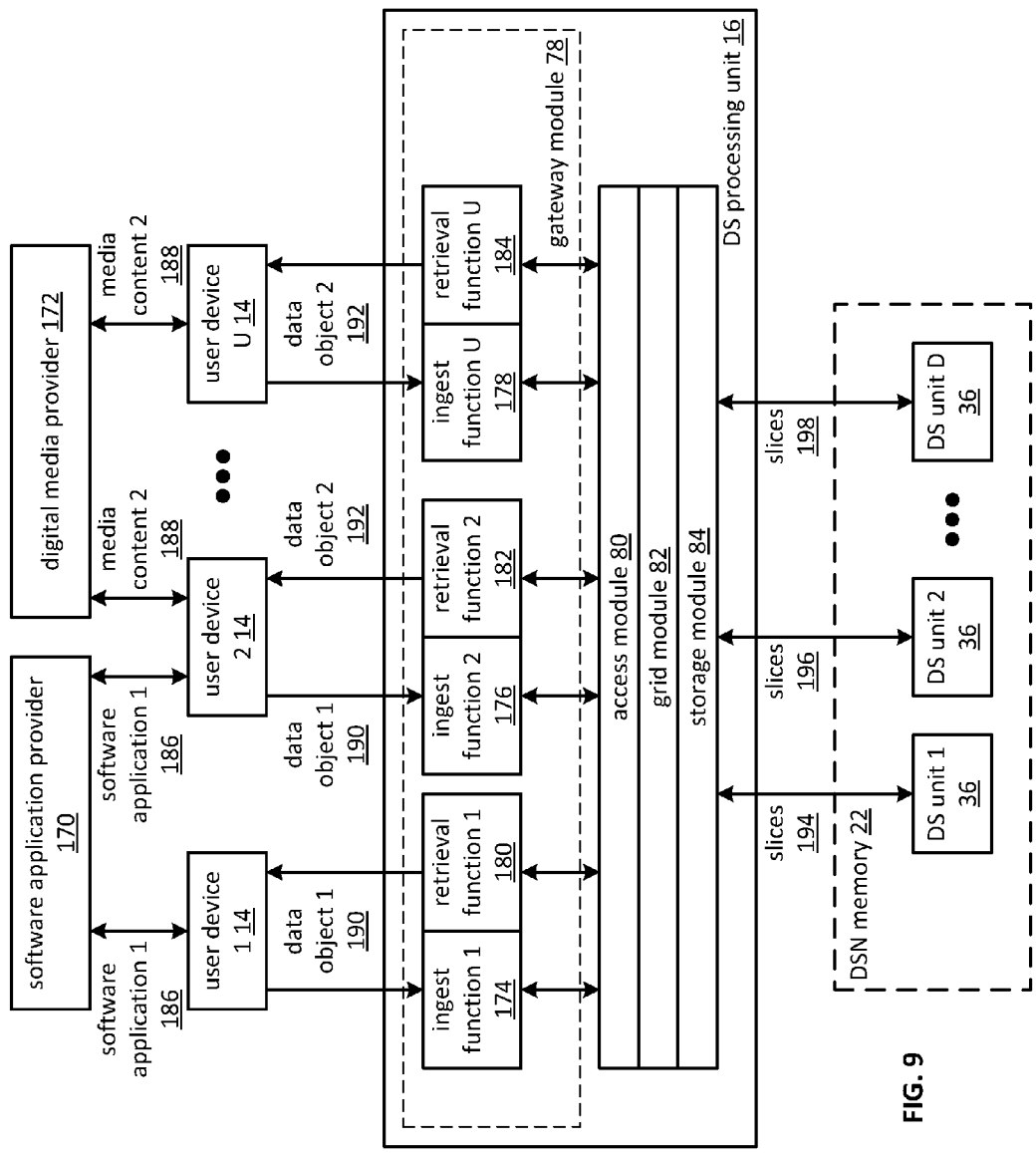
FIG. 9 is another schematic block diagram of another embodiment of a computing system in accordance with the present invention.

FIG. 9 is a schematic block diagram of another embodiment of a computing system having a dispersed storage network (DSN) for storing substantially similar data. The system includes a software application provider 170, a digital media provider 172, a plurality of user devices 1-U 14, a dispersed storage (DS) processing unit 16, and a DSN memory 22. The DSN memory 22 includes a plurality of DS units 1-D 36. The DS processing unit 16 includes a gateway module 78, an access module 80, a grid module 82, and a storage module 84. The gateway module 78 includes a plurality of ingest functions 1-U 174-178 and a plurality of retrieval functions 1-U 180-184. Alternatively, a user device 1-U 14 includes one or more of the ingest functions 1-U 174-178 and/or one or more of the of retrieval functions 1-U 180-184.

In example of operation, multiple user devices 14 receive digital content from one or more digital content providers (e.g., software application provider 170 and/or digital media provider 172). For instance, first and second user devices 14 receive a software application 186 (e.g., a text editing application) and the second and Ut$^h$ user devices 14 receive media content 188 (e.g., a movie). The respective digital content may be received concurrently or at different times.

Sometime after receiving the digital content (e.g., as part of a normal backup process, user input, etc.), the user devices desire to backup the digital content. In this regard, a user device sends a backup request regarding the digital content to the gateway module 78 of the DS processing unit. The backup request includes a write request for one or more data objects 190, 192 of the digital content, a user device ID, a data object name, a revision number, directory information, a data object 1 190, a data object hash, a data object portion size indicator, a data object size indicator, a data object type indicator, a priority indicator, a security indicator, a performance indicator, and/or digital rights management (DRM) information. The DRM information may include one or more of a digital content type indicator, a copyright indicator, an owner identifier (ID), a licensee ID info, license credentials of user device, and any other information indicating status and access rights of the digital content.

A corresponding one of the ingest function modules 174-178 receives the backup request and determines operational parameters therefrom. The operational parameters include one or more of pillar width n, read threshold k, a write threshold, DS units assigned to the user vault, a compression method, a decompression method, one or more encryption methods, one or more decryption methods, private encryption and decryption keys, and public encryption and decryption keys. Such a determination may be based on one or more of the contents of the store data object message, a vault lookup, a command, a predetermination, a table lookup, a DSN records lookup, information about previously stored data objects, computing system status, and other determinations as a function of at least some of the previous variables.

The ingest function 174-178 processes the data object in accordance with the operational parameters and an ingest method that includes one or more of partitioning, reordering, profiling, cataloging, registering, encoding, compressing, encryption key generation, encryption key storing, data encryption, encrypted data storage, linking, and tracking. For example, the ingest function partitions the data object 190 into portions, encrypts (e.g., subtracts, performs a particular mathematical and/or logical function, etc.) each portion utilizing a unique random key that is generated based on the data object to produce an encrypted data object. For instance, the key may be a copy of the data object or it may be based on a mathematical and/or logical function performed on the bits of the data object. As a specific example, when the data object is encrypted with the key, the resulting encrypted data object will have long series of 1's and/or 0's, which can be compressed into a much smaller number of bits than the original data.

The ingest function sends the compressed and encrypted data object to the remaining sections of the DS processing unit 16 for storage in the DSN memory as slices 194, 196, or 198. The ingest function also determines whether the key, or a similar key (approximately (90% or greater bit match), has already been stored in the DSN memory. If not, the ingest function sends the key to the remaining sections of the DS processing for storing the key in the DSN memory.

If, however, the key, or a similar key, is already stored in the DSN memory, the ingest function generates a key reference that references the existing key, or similar key, and stores it in the DSN memory. The key reference indentifies the user device, the data object, the storage information regarding the key or similar key, and any other relevant information. The key reference is significantly smaller (e.g., at most 10%) than the key or the similar key.

In an example of retrieval, retrieval function 1 174 receives a retrieve data object 1 190 message from the user device 14 where the retrieve data object message may include one or more of a retrieve command, a retrieve request, a user device ID, a data object name, a revision number, directory information, a data object hash, a data object portion size indicator, a data object size indicator, a data object type indicator, a priority indicator, a security indicator, a performance indicator, and digital rights management (DRM) information. The retrieval function 1 134 determines operational parameters based on one or more of the contents of the retrieve data object message, a vault lookup, a command, a predetermination, a table lookup, a DSN records lookup, information about previously stored data objects, computing system status, and other determinations as a function of at least some of the previous variables.

Continuing with the retrieval example, the retrieval function 1 174 retrieves information (e.g., of the slices 194, 196, or 198) from the DSN memory 22 in accordance with the operational parameters and a retrieval method that may include one or more of tracking, linking, profiling, cataloging, registration checking, encryption key retrieving, decompressing, decoding, encryption key regeneration, encrypted data retrieval, data decryption, reordering, and partition aggregation. The retrieval function 1 74 processes the retrieved information to reproduce the requested data object in accordance with the operational parameters and the retrieval method. For example, the retrieval function 1 decrypts an encrypted random key from the DSN memory 22 and utilizes the decrypted key to decrypt the encrypted data retrieved from the DSN memory 22 to produce a portion of the data object. The retrieval function 1 74 repeats the above steps to create each portion of the data object. The retrieval function 1 174 aggregates the portions to create the data object. The retrieval function once every four sends the data object to the user device 2 14 that requested the retrieval. The method operation of the ingest function and retrieval function are discussed in greater detail with reference to FIGS. 10-14.

FIG. 10 is a schematic block diagram of an embodiment of an ingest function that includes a key generator 200, an object encryptor 202, a data compressor 204, a key reference generator 206, a key reference profiler 208, a key information de-compressor 210, a difference generator 212, and a key information compressor 214.

In a storage example of operation, the ingest function receives the data object 216, which the key generator 200 uses to generate a key 220. For example, the key generator 200 generates the key 220 to be substantially the same as the data object 216, or portion thereof. In another example, the key generator 200 generates the key 220 to be the same length as the data object, or portion thereof, but each bit is a generated in accordance with a key generation method, which is discussed in greater detail with reference to FIG. 12.

The key reference generator 206 produces a key reference 228 based on the key 220. In an example, the key reference 228 is a hash of the key 220. The key reference profiler 208 retrieves key reference information 236 from a dispersed storage network (DSN) memory to utilize in determining if a similar key reference 228 has been stored in the DSN memory. The key reference profiler 208 produces key information address 232 and a key reference 230 corresponding to the key reference information 236. The key reference profiler 208 saves the key reference 228 in the DSN memory as key reference information 236 when the key reference profiler 208 determines that a similar key reference has not been previously stored in the DSN memory.

The key information de-compressor 210 receives the key information address 232 from the key reference profiler 208 and retrieves previously stored key information 234 from the DSN memory. The key information de-compressor 210 decompresses the key information 234 to produce a prior key 226, which may be similar to the key 220. The difference function 212 generates a difference key 238 by subtracting the prior key 226 from the key 220. Note that the difference key 238 may include many bits that are zero when the key 220 and the prior key 226 are similar. For instance, the key information compressor 214 compresses the difference key 238 and a key reference 230 of the prior key 226 to produce key information 234, which may reduce the memory storage requirements. In another instance, the key information compressor 214 compresses the key 220 and the key reference number 228 of the key 220 to produce key information 234. The key info compressor 214 sends the key information 234 to an access module of a dispersed storage (DS) processing unit to create encoded data slices wherein the DS processing unit stores the encoded data slices in the DSN memory.

The object encryptor 202 encrypts the at least the portion of the data object 218 utilizing the key 220 in accordance with the operational parameters (e.g., encryption algorithm type) to produce an output 222. The data compressor 204 compresses the encrypted portion of the data object 222 to produce encrypted data portion 224 thus reducing memory storage requirements. The data compressor 204 sends the compressed encrypted portion of the data object as the encrypted data portion 224 to the access module of the DS processing unit to create encoded data slices and store the slices in the DSN memory. The method of operation of the ingest function is discussed in greater detail with reference to FIG. 13.

FIG. 11 is a schematic block diagram of an embodiment of a retrieval function that includes a key reference retriever 240, a key information de-compressor 242, an addition function 241, a data de-compressor 244, and an object decryptor 246.

In an example of operation, the key information de-compressor 242 retrieves compressed key information 234 from a dispersed storage network (DSN) memory and decompresses the compressed key information 234 to produce key information, which may include one or more of a prior key reference number 228, a difference key 238, and a prior key 226. The key information de-compressor 242 sends the prior key reference number 228 to the key reference retriever 240 when the key information de-compressor 242 determines that the key information does not include the key (e.g., the key information includes the difference key 238 and the prior key reference number 228). In such a scenario, the key reference retriever 240 sends a retrieval request to an access module of a dispersed storage (DS) processing unit to retrieve key reference information 236 based on the prior key reference number 228.

The key reference retriever 240 receives the key reference information 236 and determines a key information address 232 (e.g., a DSN address of the location where the prior key to the 26 is stored that corresponds to the key reference number 228). The key reference retriever 240 sends the key information address 232 to the key information de-compressor 242. Next, the key information de-compressor 242 retrieves compressed key information 234 from the DSN memory based on the key information address 232, decompresses the compressed key information 234 to produce the prior key 226. For instance, the key information de-compressor 242 sends the prior key 226 and the difference key 238 to the addition function 241. In another instance, the key information de-compressor 242 sends the key as the prior key 226 and a null difference key 238 (e.g., all zeros) to the addition function 241. The addition function 241 adds the prior key 226 (e.g., prior key or key) to the difference key 238 (e.g., the retrieved difference key or a null key) to produce the key 220. The addition function 241 sends the key 220 to the object decryptor 246.

The data de-compressor 244 retrieves and decompresses compressed encrypted data object information 248 from the DSN memory in accordance with the operational parameters to produce a de-compressed encrypted data object portion 250. The object decryptor 246 decrypts the de-compressed encrypted data object portion 250 utilizing the key 220 in accordance with the operational parameters (e.g., decryption algorithm type). The object decryptor 246 may aggregate portions of the retrieved data object 250 to reproduce the requested data object 216. The object decryptor 246 sends the output 252 as the data object 216 to the user device. The method of operation of the retrieval function is discussed in greater detail with reference to FIG. 14.

Figure 12:
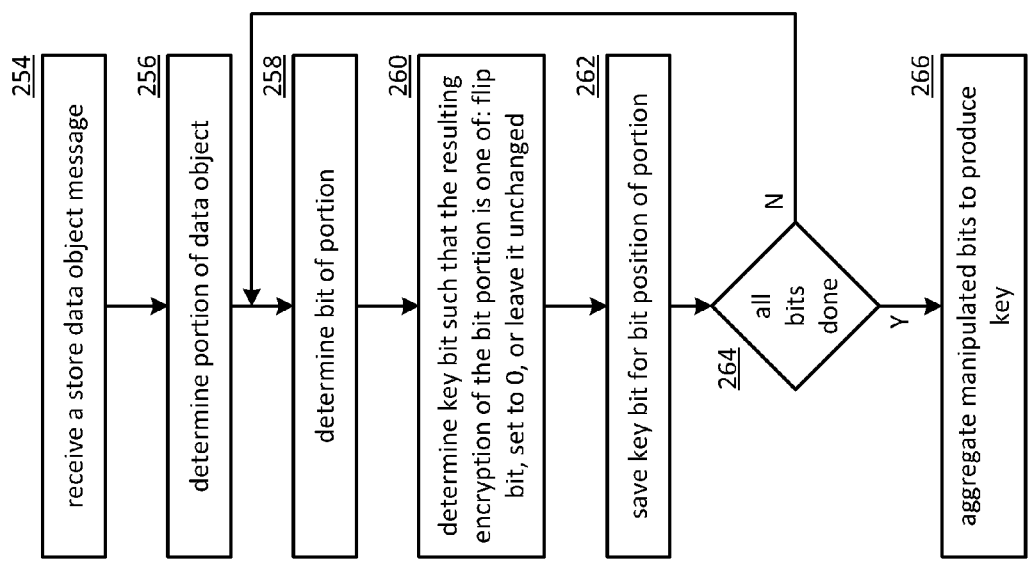
FIG. 12 is a flowchart illustrating an example of generating a key in accordance with the present invention.

FIG. 12 is a flowchart illustrating an example of generating a key. The method begins with step 254 where a processing module receives a store data object message as a memory access request and/or as a backup request. The method continues at step 256 where the processing module determines whether the data is partitioned into more than one data segment. Such a determination may be based on one or more of a data segment size lookup in a user vault, a data object, a user ID, a list, a predetermination, a command, a message, operational parameters, a data object name, a data object, a data object hash, DRM information, a data size indicator, a data type indicator, a priority indicator, a security indicator, and a performance indicator.

The method continues at step 258 where the processing module determines a bit of the data portion to begin or continue generating the key.

In an example, the processing module starts with the first bit and continues with successive bits or bits in some predetermined pattern. Such a determination may be based on one or more of where a method left off last time (e.g., which bit), a data segment size, the data object, a user ID, a list, a predetermination, a command, a message, operational parameters, a data object name, a data object, a data object hash, DRM information, a data size indicator, a data type indicator, a priority indicator, a security indicator, and performance indicator.

The method continues at step 260 where the processing module determines a key bit in accordance with a bit method such that a subsequent encryption of a bit of the data portion using the corresponding encryption key bit results in an encrypted bit that is a logic (e.g., XOR, AND, OR, etc.) or mathematical (e.g., add, subtract, multiply, divide, inversion, etc.) resultant of the original bit, a logic zero, a logic 1, or the original bit value. The processing module may determine the bit method based on one or more of a probability function based on one or more of the value of X, the value of X, a data segment size, the data object, a user ID, a list, a predetermination, a command, a message, operational parameters, a data object name, a data object, a data object hash, DRM information, a data size indicator, a data type indicator, a priority indicator, a security indicator, and performance indicator. For instance, the probability of setting a bit to zero is zero and the probability of each of flipping the bit or leaving the bit unchanged is 50% when X equals one or the probability of setting the bit to zero is 100% and the probability of each of flipping the bit or leaving the bit unchanged is 0% when X equals zero.

The method continues at step 262 where the processing module temporarily saves the key bit for the bit position of the portion. The method continues at step 264 where the processing module determines whether all bits are done (e.g., all processed or a predetermined number of the bits have been processed). The method repeats at step 258 when all of the bits have not been processed.

When all of the bits have been processed, the method continues at step 266 where the processing module aggregates the key bits to produce a key that is subsequently utilized to encrypt the data portion to produce an encrypted data portion. Note that the method repeats for all portions of the data object until keys for all of the portions (e.g., data segments) have been created. Note that the key length may be the same length as the data object portion. In an output example, the processing module produces a key of 101100 when the data portion is 111000, the encryption method is an XOR logical function, and the processing module determines to flip the first bit (e.g., from left to right), leave the second bit unchanged, force the third bit to zero, flip the fourth bit, leave the fifth bit unchanged, and set the sixth bit to zero.

Figure 13:
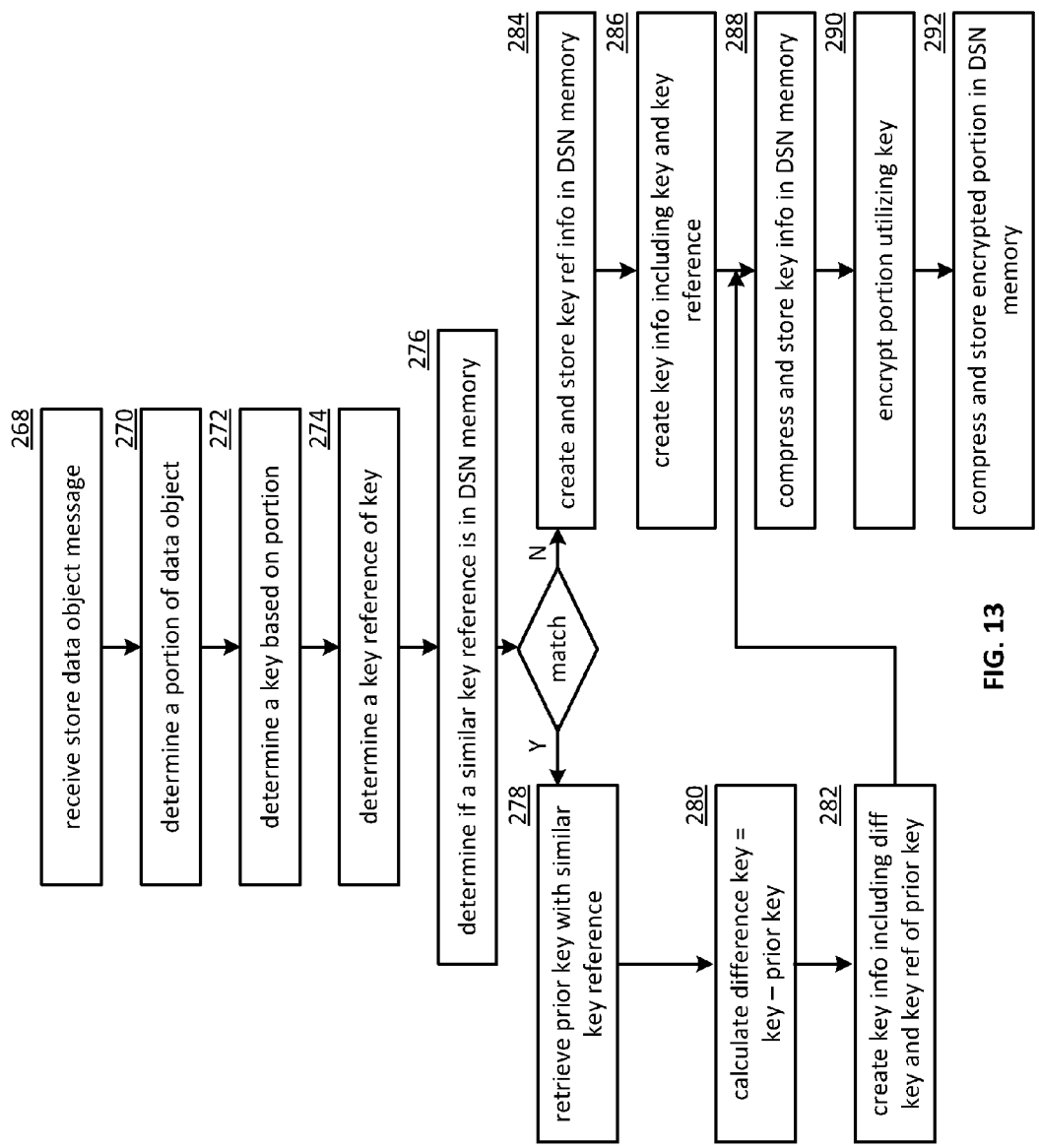
FIG. 13 is a flowchart illustrating an example of ingesting data in accordance with the present invention.

FIG. 13 is a flowchart illustrating an example of ingesting data. The method begins with step 268 where a processing module receives a store data object message. The method continues at step 270 where the processing module determines at least a portion of the data object based on one or more of the operational parameters, a previous portion determination, and information in the store data object message.

The method continues at step 272 where the processing module determines a key based on one or more of the portion of the data object, an encryption algorithm, the operational parameters, and content of the store data object message. The method continues at step 274 where the processing module determines a key reference based on one or more of the key, the portion of the data object, a hash algorithm, an encryption algorithm, the operational parameters, and content of the store data object message.

The method continues at step 276 where the processing module determines whether a similar key reference is stored in a dispersed storage network (DSN) memory based on a search of the key reference information stored in the DSN memory and a comparison of a key reference profile to key reference profiles retrieved in the search. The processing module determines that a similar key reference is in the DSN memory when the comparison reveals that the key reference is substantially the same as a key reference in the DSN memory.

When the similar key reference is stored in the DSN memory, the method continues at step 278 where the processing module determines a key information address based on the key reference number that is similar to the present key reference number. Such a determination may be based on one or more of a lookup in a key reference table, a vault lookup, a list, a command, a message, and a predetermination. The processing module retrieves a prior key with a similar key reference based on retrieving key information from the DSN memory located at the key information address. The processing module may decompress the key information in accordance with the operational parameters to produce the prior key.

The method continues at step 280 where the processing module calculates a difference key based on the key and the prior key. In an example, the difference key may be calculated as the difference between the key and the prior key. Note that the difference key may include more zeros than ones when the key and the prior key are similar. Further note that a difference key with more zeros than ones may be highly compressible and may provide a storage efficiency improvement to the DSN memory system. The method continues at step 282 where the processing module creates key information including the difference key and the key reference of the prior key. Note that the difference key in the key reference of the prior key may be utilized in a subsequent retrieval scenario. The method continues step 288, which will be discussed below.

When the similar key reference is not stored in the DSN memory, the method continues at step 284 where the processing module creates and stores the key reference information in the DSN memory. The processing module also determines a DSN address of where the key information will be stored based on the operational parameters and/or content of the store data object message. The method continues at step 286 where the processing module creates key reference information that includes the key reference number, the key, and/or a DSN address of where the key information will be stored (e.g., key info address). The processing module sends the key reference information to an access module of a DS processing unit to store the key reference information in the DSN memory.

The method continues at step 288 where the processing module compresses the key information to reduce the memory storage requirements. Next, the processing module sends the compressed key information to the access module of the DS processing unit to store the key information in the DSN memory by creating encoded data slices and storing the encoded data slices in the DSN memory. The method continues at step 290 where the processing module encrypts (e.g., XOR) the portion of the data object utilizing the key in accordance with the operational parameters (e.g., encryption algorithm type). The method continues at step 292 where the processing module compresses the encrypted portion of the data object to reduce the memory storage requirements. Next, the processing module sends the compressed encrypted portion of the data object as the encrypted data portion to the access module of the DS processing unit to create encoded data slices and store the slices in the DSN memory.

Figure 14:
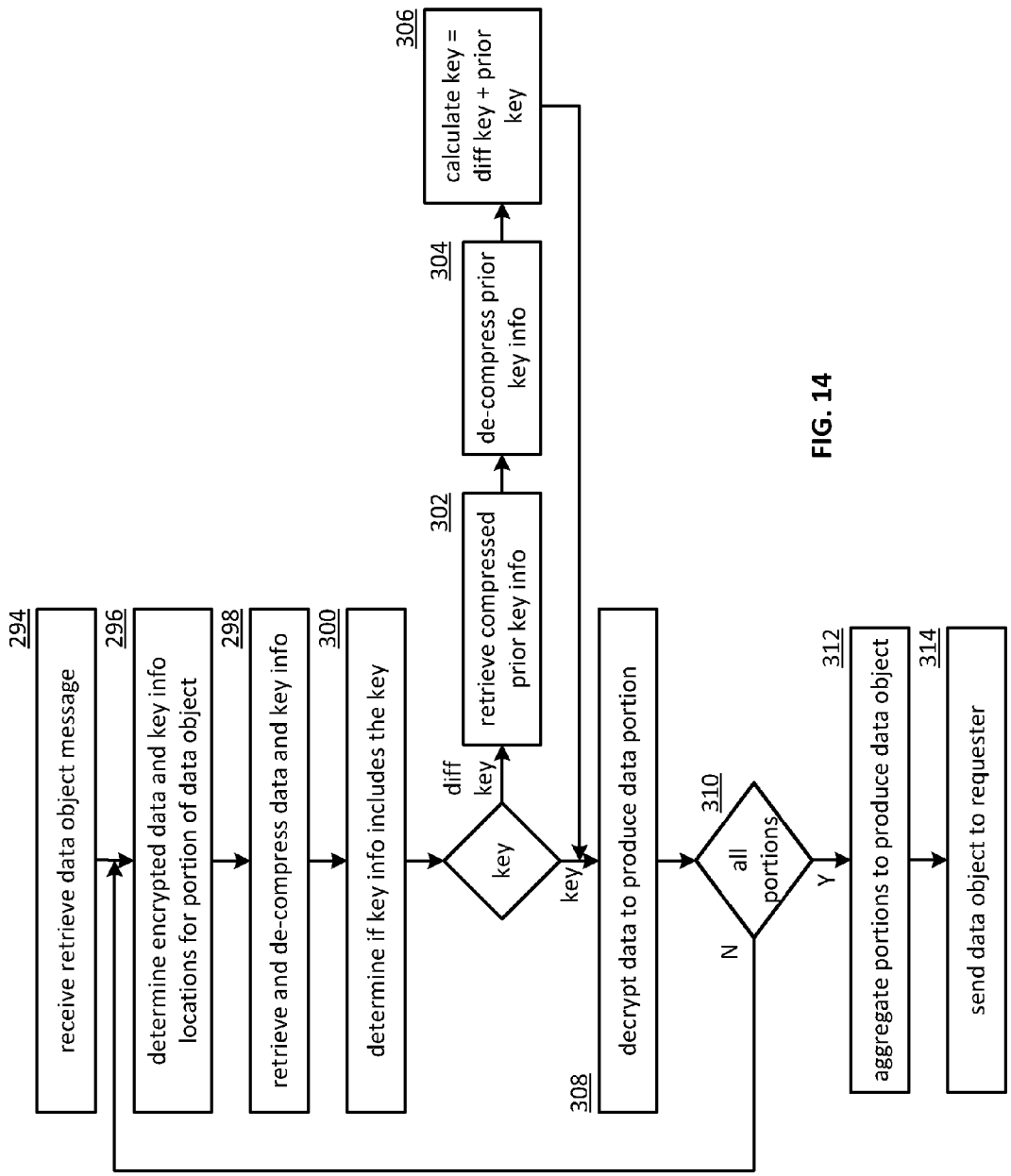
FIG. 14 is a flowchart illustrating an example of retrieving data in accordance with the present invention.

FIG. 14 is a flowchart illustrating an example of retrieving data. The method begins with step 294 where a processing module receives a retrieve data object message (e.g., from a user device). The method continues at step 296 where the processing module determines dispersed storage network (DSN) addresses, which indicate where the key information and the encrypted data object are stored. The method continues at step 298 where the processing module sends a retrieval request including the DSN address of the encrypted data portion to the access module of a DS processing unit to retrieve a compressed encrypted data portion from the DSN memory. Next, the processing module receives the compressed encrypted data portion and decompresses the compressed encrypted data portion in accordance with the operational parameters to produce an encrypted data portion. Next, the processing module sends a retrieval request including the DSN address of the key information to the access module of the DS processing unit to retrieve compressed key information from the DSN memory. Next, the processing module receives the compressed key information and decompresses the compressed key information in accordance with the operational parameters to produce key information.

The method continues at step 300 where the processing module determines a key reference number from the key information and determines whether the key information includes a key (e.g., a key in a key field) or a difference key paired with a key reference number of a prior key. The method branches to step 308 when the processing module determines that the key information includes a key (e.g., not the difference key). The method continues to step 302 when the processing module determines that the key information does not include a key (e.g., it includes a difference key).

The method continues at step 302 where the processing module sends a request to the access module of the DS processing unit to retrieve key reference information based on the retrieved decompressed key reference number of the prior key. Note that a retrieval function may receive the key reference information and determine a key information address (e.g., a DSN address of the location where a prior key is stored that corresponds to the key reference of the prior key). Next, the processing module sends a retrieval request including the key information address (e.g., that includes the desired prior key) to the access module of the DS processing to retrieve key information from the DSN memory. The processing module receives the compressed key information retrieved from the DSN memory. The method continues at step 304 where the processing module decompresses the key information to produce the prior key. The method continues at step 306 where the processing module calculates the key based on the difference key and the prior key. In an example, the processing module adds the difference key to the prior key to produce the key.

The method continues at step 308 where the processing module decrypts the data to produce the data portion utilizing the key in accordance with the operational parameters (e.g., decryption algorithm type) to produce a data portion when the processing module determines that the key information includes a key. In an example, the processing module performs the decryption with an XOR logical function of the data portion and the key. In another example, the processing module performs the decryption with the addition of the data portion and the key. The method continues at step 310 where the processing module determines if all portions of the data object have been produced based on comparing the number and/or size of the portions produced so far to the data object size and/or number of total portions that comprise the data object. The method repeats at step 296 when the processing module determines that all portions of the data object have not been produced. When all portions of the data object have been produced, the method continues at step 312 where the processing module aggregates the portions of the retrieved data object to reproduce the requested data object. The method continues at step 314 where the processing module sends the data object to the requester (e.g., the user device).

Figure 15A:
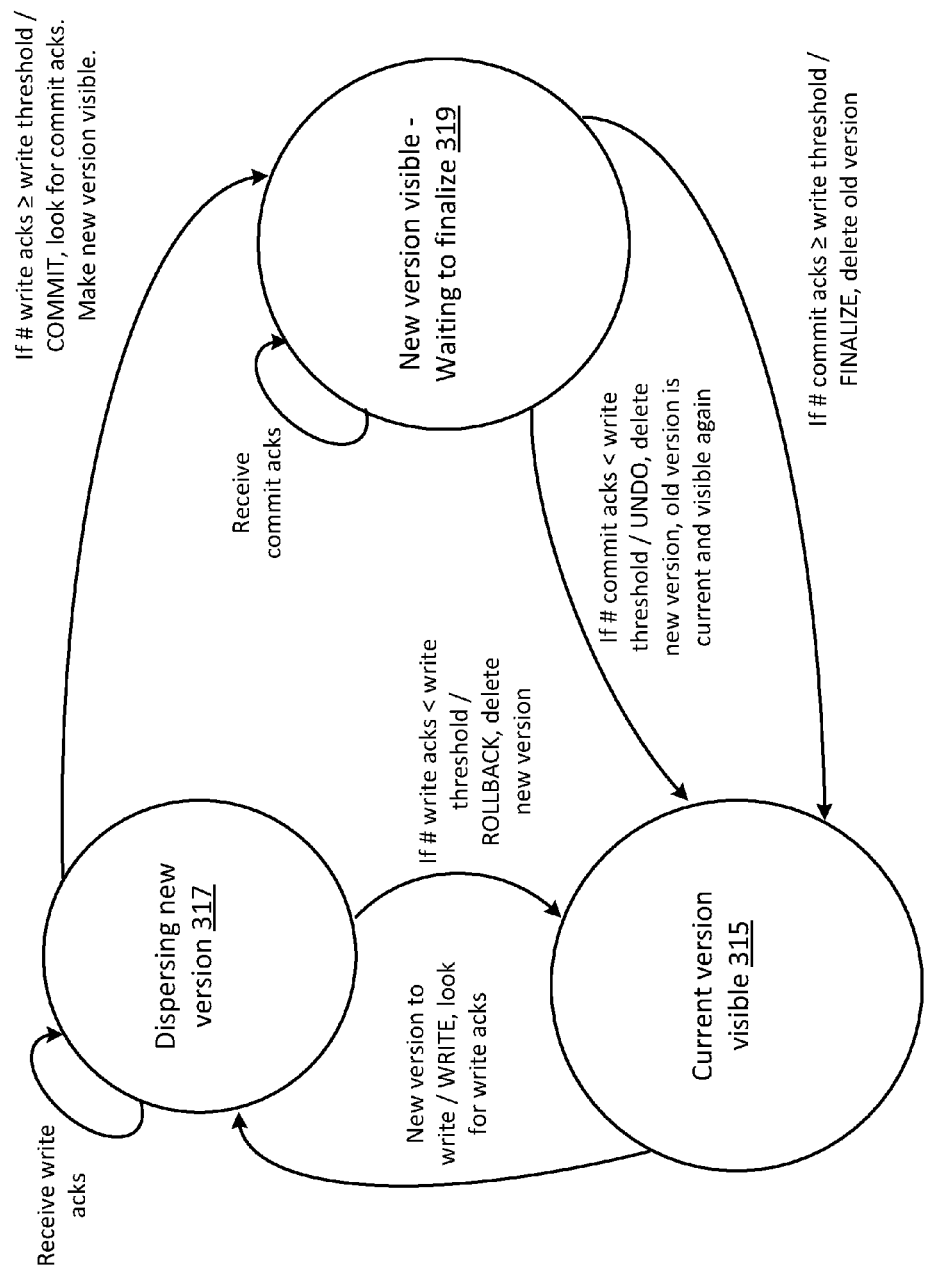
FIG. 15A is a state diagram of an example embodiment of a dispersed storage system in accordance with the present invention.

FIG. 15A is a state diagram of an example embodiment of a dispersed storage system implementing a write function. The diagram includes three states: a current version visible state 315, a dispersing new version state 317, and a new version visible, waiting to finalize state 319. The text between the states, which is in the form of "input"/"action", indicates transitions between the states.

A write function begins in the current version visible state 315 (i.e., the data object is visible (e.g., accessible) in dispersed storage (DS) storage units). The write function changes to the dispersing new version state 317 when the input of "new version to write" is received. For example, a processing module (e.g., of a DS processing unit) receives a write command from a user device to store data. In this state 317, the processing module generates a plurality of encoded data slices of the data, determines which DS units will store the data, and sends each of the DS units a write command and an encoded data slice of the plurality of encoded data slices.

While in the dispersing new version state 317, the processing module initializes a timeout period and waits to receive acknowledgements from the DS units. For example, when a DS unit receives its write command, the DS unit saves the encoded data slice of a new version and sends a write acknowledgement back to the processing module. As the processing module receives write acknowledgements, it determines whether it has received a write threshold number of acknowledgements (e.g., a number that exceeds the reconstruction threshold but less than the width or pillar number) prior to expiration of the timeout period. If not, the processing module issues rollback commands to the DS units and the write function state reverts back to the current version visible state 315. Note that prior to issuing the rollback commands, the processing module may resend one or more of the plurality of write commands to the DS units.

If the number of received write acknowledgement equals or exceeds the write threshold (e.g., write acks≥write threshold), the processing module issues a plurality of commit commands to the DS units and the write function state changes to the new version visible & waiting to finalize state 319. The processing module may start a second timeout window. The DS unit may make the new version visible (e.g., it can be retrieved as can the old version) 319 and the DS unit sends a commit acknowledgement to the processing module.

In new version visible state 319, the processing module initializes another timeout period and waits to receive commit acknowledgements from the DS units. If the timeout period expires prior to receiving a write threshold number of commit acknowledgements, the processing module issues a plurality of undo commands to the DS units and the write function state reverts to the current version visible state 315. In response to receiving its undo command, a DS unit deletes the new version of the data (i.e., its encoded data slice or slices).

If the processing module receives at least a write threshold number of commit acknowledgements, the processing module sends a plurality of finalize commands to the DS units and the write function state changes to the current version visible state 315. In this state the data stored is now representative of the new data and not the old data. The method of operation to store data in the DS units is discussed in greater detail with reference to FIGS. 15B-15I.

Figure 15B:
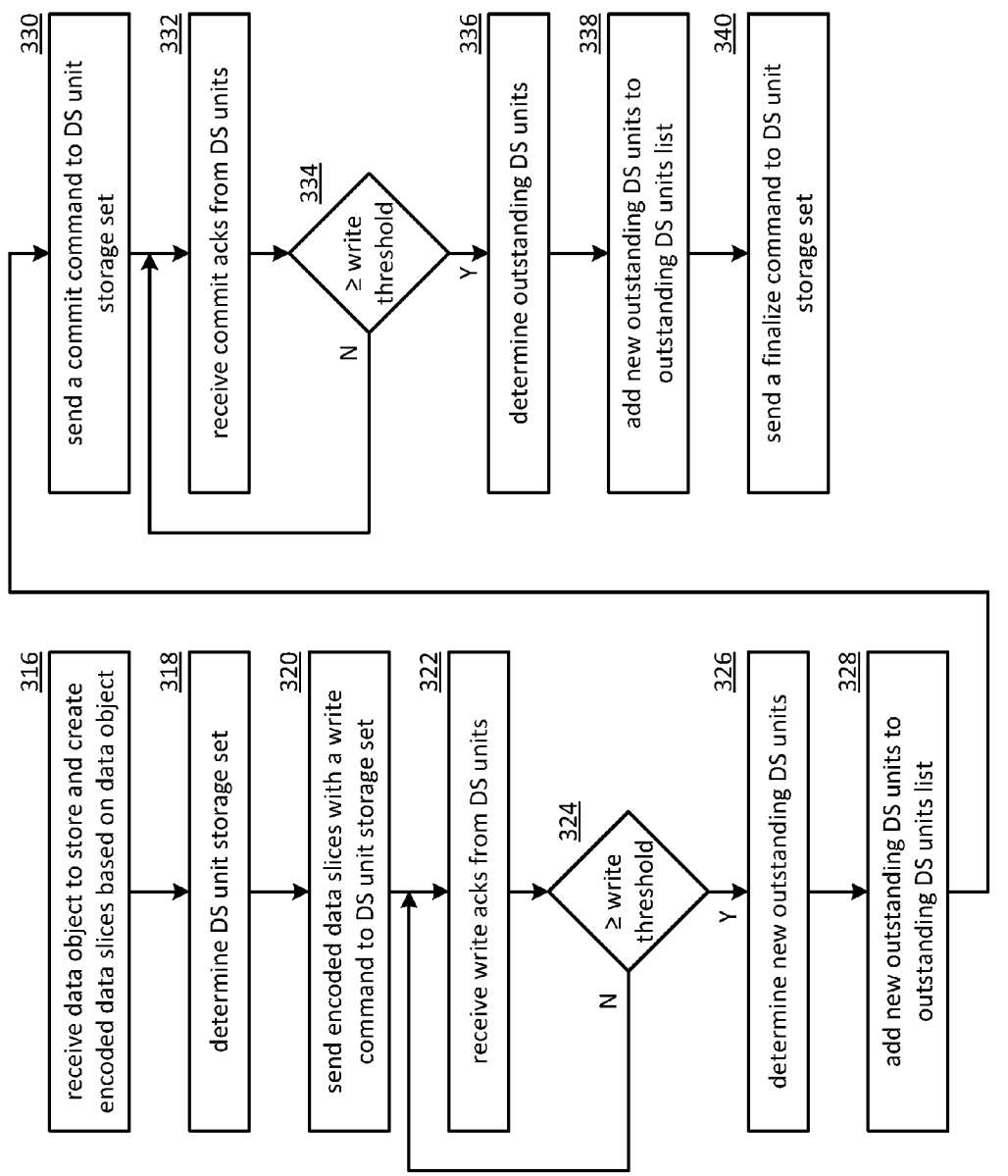
FIG. 15B is a flowchart illustrating an example of storing data in accordance with the present invention.

FIG. 15B is flowchart illustrating an example of storing data. The method begins with step 316 where a processing module receives a store data object message that includes data (e.g., from one of a user device, a dispersed storage (DS) processing unit, a storage integrity processing unit, a DS managing unit, or a DS unit). The store data object message may include one or more of a store request, a user identifier (ID), a password, a security certificate, a data object name, a data object, a data type indicator, a data size indicator, a priority indicator, a security indicator, and a performance indicator. Next, the processing module determines error coding dispersal storage function parameters as previously discussed. At step 316, processing module dispersed storage error encodes at least a portion of the data in accordance with the error coding dispersal storage function parameters to produce a set of encoded data slices.

The method continues at step 318 where the processing module determines a DS unit storage set, which includes a DS unit ID for each DS unit of the DS unit storage set. Such a determination may be based on one or more of the error coding dispersal storage function parameters, a user ID, a vault lookup, a source name, a slice name, a virtual dispersed storage network (DSN) address to physical location table lookup, information received in a store data object request message, a list, a command, a predetermination, and a message. For example, the processing module determines the DS unit storage set to include 16 DS unit IDs based on the user ID, a vault lookup, and a virtual DSN address to physical location table lookup.

The method continues at step 320 where the processing module sends the set of encoded data slices with a write command to the DS unit storage set. In an example, the processing module sends slices batched by a common pillar number to a corresponding DS unit. For example, the processing module sends substantially all of the encoded data slices for pillar two to DS unit two as a batch message. Note that the batch message may include one or more of slice names, encoded data slices, a command (e.g., write etc.), a user ID, a password, a security certificate, a data object name, a source name, a DS processing unit ID, and a DS unit ID. Note that the processing module may send encoded data slices via a network. Further note, that the network and/or DS unit may fail from time to time thus preventing the write command and the encoded data slices from successful reception by the DS unit. The DS unit may send the processing module a write acknowledgment message in response to receiving the write command and the encoded data slices. Further note, that the DS unit may temporarily save the encoded data slices in the memory of the DS unit and may not allow access to the encoded data slices (e.g., the encoded data slices may not be visible to units accessing the DSN memory). In such a scenario, a user device will not be able to access these encoded data slices at this point in time.

The method of continues at step 322 where the processing module receives write acknowledgments from DS units of the DS unit storage set that successfully received the write command and encoded data slices. Note that the processing module may receive write acknowledgments from the DS units at varying times relative to each other as a function of the time delays through the network and/or time delays within the DS units. The method continues at step 324 where the processing module determines whether a write threshold number of write acknowledgments have been received by comparing the number of write acknowledgments received to the write threshold. When a write threshold number of acknowledgments have not been received within a given time frame, the method repeats at step 322.

When a write threshold number of acknowledgments have been received, the method continues at step 326 where the processing module determines new outstanding DS units (e.g., DS units from which a write acknowledgment has not yet been received). In an example, the processing module determines no new outstanding DS units when each DS unit responded with a write acknowledgment (e.g., the full pillar width number of DS units). In another example, the processing module determines that there are two new outstanding DS units when 14 write acknowledgments have been received, the pillar width is 16, a read threshold is 10, and the write threshold is 11.

The method continues at step 328 where the processing module adds the new outstanding DS units to an outstanding DS unit list, wherein the outstanding DS unit is identified by its unit ID, a slice name, a source name, a data object name, encoded data slices, a failed response indicator, a storage sequence state indicator, a DS processing unit ID, a user ID, and/or a timestamp. In an example, the outstanding DS unit list may be associated with one or more of a user ID, a group of user IDs, a DSN memory, a DS processing unit, a user device, a DS unit, and one or more DS unit storage sets. Note that the outstanding DS unit list may be limited to a finite number of outstanding DS unit entries such that the oldest entry is discarded when a new entry is added when the outstanding DS unit list is full.

The method continues at step 330 where the processing module sends a commit command to the DS unit storage set. DS units send a commit acknowledgment message in response to receiving a commit command. Note that the DS unit may now allow access to the associated encoded data slices. Further note that the DS unit may simultaneously allow access to the most recently stored revision and the previous revision.

The method continues at step 332 where the processing module receives commit acknowledgment from DS units of the DS unit storage set that successfully received the commit command. The method continues at step 334 where the processing module determines if a write threshold number of commit acknowledgments have been received within a given time period. When the write threshold number of commit acknowledgments have not been received within the given time period, the method repeats at step 332.

When the write threshold number of commit acknowledgments have been received, the method continues at step 336 where the processing module determines new outstanding DS units (e.g., DS units from which a commit acknowledgment has not been received). The method continues at step 338 where the processing module adds any new outstanding DS units to the outstanding DS unit list. Note that the list may include DS units that did not acknowledge the write command and DS units that did not acknowledge the commit command.

The method continues at step 340 where the processing module sends a finalize command to the DS unit storage set. Note that since a write threshold number of DS units have acknowledged receiving the commit command and have made the new revision of the data object visible to those accessing the DSN memory, the DS units may now delete the previous revision of the same data object from the memory of the DS units in response to receiving a finalize command.

The processing module may from time to time process entries of the outstanding DS unit list to facilitate completion of a write cycle to DS units that had previously failed at least one step of the overall process. In an example, the processing module removes an oldest entry from the outstanding DS units list, determines if the DS unit has subsequently responded with an acknowledgment, determines an action step based on the status of acknowledgment, and implements an action step. For instance, the processing module executes the action step which includes sending a repeat of the command associated with the missing acknowledgment to the DS unit and/or adding the DS unit back to the outstanding DS unit list. In another instance, the processing module executes the action step, which includes removing the outstanding DS unit from the list when it provides the missing acknowledgment.

Figure 15C:
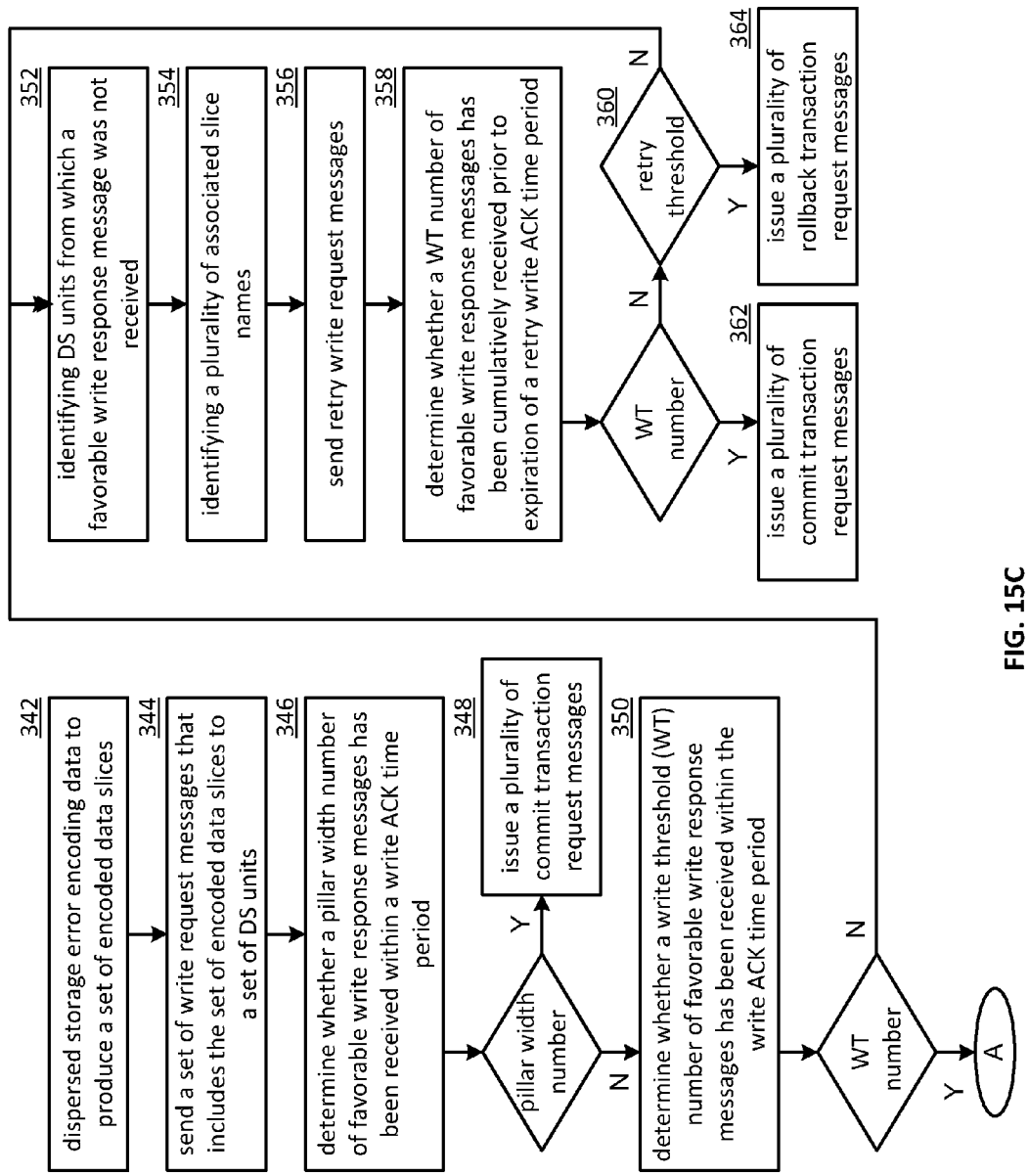
FIG. 15C is another flowchart illustrating another example of storing data in accordance with the present invention.

FIG. 15C is a flowchart illustrating another example of storing data. The method begins with step 342 where a processing module dispersed storage error encodes data to produce a set of encoded data slices. The method continues at step 344 where the processing module sends a set of write request messages to a set of dispersed storage (DS) units, wherein each of the set of write request messages includes an encoded data slice of the set of encoded data slices. In addition, each of the write request messages may include a unique slice name and a transaction number. Note that the transaction number may be common to each write request message of the set of write request messages.

The method continues at step 346 where the processing module determines whether a pillar width number (e.g., all possible) of favorable write response messages has been received within a write acknowledgement (ACK) time period (e.g., elapsed time from when the write request messages were sent until the write response message was received is less than the write ACK time period). When the pillar width number of favorable write response messages have been received, the method continues to step 348 where the processing module issues a plurality of commit transaction request messages.

When the pillar width number of favorable write response messages have not been received, the method continues at step 350 where processing module determines whether a write threshold number of favorable write response messages has been received within the write ACK time period. When the write threshold number of favorable write response messages has been received, the method continues via path A, which is described in greater detail with reference to FIGS. 15 D, E, and H.

When the write threshold number of favorable write response messages has not been received, the method continues at step 352 where the processing module identifies each DS unit of the set of DS units from which a favorable write response message was not received. The method continues at step 354 where processing module identifies each slice name associated with each of the identified DS units to produce identified slice names. For example, the processing module identifies a slice name wherein an encoded data slice with the slice name was previously included in a write request message sent to an identified DS unit.

The method continues at step 356 where the processing module sends a plurality of retry write request messages to the identified DS units, wherein a retry write request message includes an encoded data slice of the set of encoded data slices associated with one of identified slice names. For example, the retry write request message includes the transaction number from the previous write request message. In another example, the retry write request message includes a new transaction number that is different from the previous write request message.

The method continues at step 358 where the processing module determines whether the write threshold number of favorable write response messages has been cumulatively (e.g., in response to either or both of an original write request sequence and a retry write request sequence) received prior to expiration of a retry write ACK time period. Note that the retry write ACK time period may be initiated when a retry write request message is sent. When the write threshold has been reached, the method continues at step 362 where the processing module issues a plurality of commit transaction request messages.

When the write threshold number of favorable write response messages has not been cumulatively received, the method continues to step 360 where the processing module determines whether a retry threshold has been reached. Such a retry threshold may be utilized to specify how many times the method loops to send retry write request messages. When the retry threshold has been reached, the method continues at step 364 where the processing module issues rollback transaction request messages.

Figures 15D, 15E:
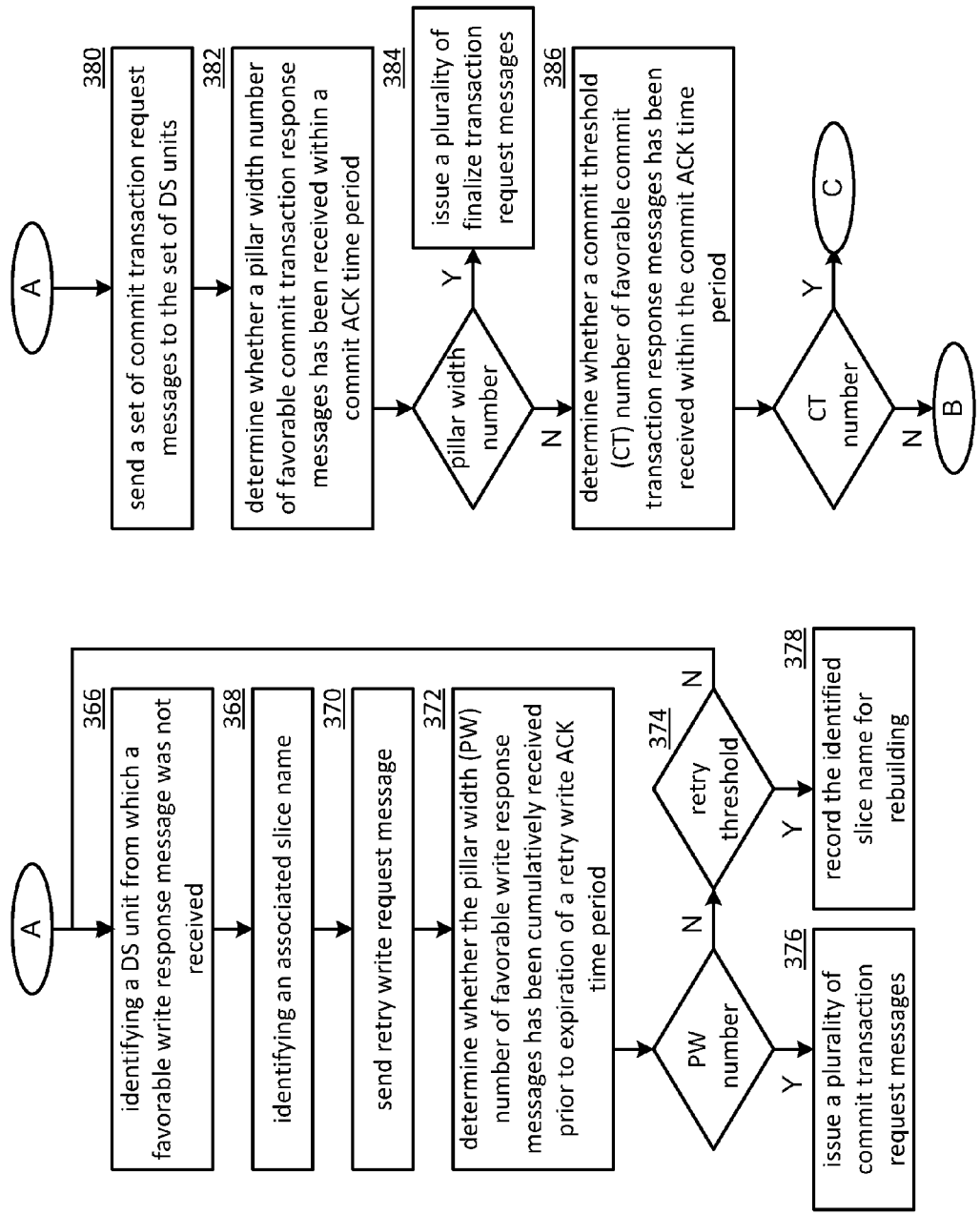
FIG. 15D is another flowchart illustrating another example of storing data in accordance with the present invention.
FIG. 15E is another flowchart illustrating another example of storing data in accordance with the present invention.

FIG. 15D is a flowchart illustrating path A from FIG. 15C. Path A begins at step 366 where the processing module identifies a dispersed storage (DS) unit from which a favorable write response message was not received during a write ACK time period. The method continues at step 368 where processing module identifies a slice name associated with the identified DS unit. For example, the processing module identifies the slice name wherein an encoded data slice with the slice name was previously included in a write request message sent to the identified DS unit. The method continues at step 370 where the processing module sends a retry write request message to the identified DS unit, wherein the retry write request includes an encoded data slice of the set of encoded data slices associated with the identified slice name. In an example, the retry write request message includes the transaction number from the previous write request message. In another example, the retry write request message includes a new transaction number that is different from the previous write request message.

The method continues at step 372 where the processing module determines whether a pillar width number of favorable write response messages has been cumulatively received prior to expiration of a retry write ACK time period. When the pillar width number of favorable write response messages has not been cumulatively received, the method continues at step 376 where the processing module issues a plurality of commit transaction request messages.

When the pillar width number of favorable write response messages has not been cumulatively received, the method continues to step 374 where the processing module determines whether a retry threshold has been reached as previously discussed. If not, the method repeats. If so, the method continues at step 378 where the processing module records the identified slice name for rebuilding. In addition, the processing module may initiate a rebuilding sequence to rebuild an encoded data slice of the identified slice name.

FIG. 15E is a flowchart illustrating path A from FIG. 15C. Path A begins at step 380 where the processing module sends a set of commit transaction request messages to a set of dispersed storage (DS units). The method continues at step 382 where the processing module determines whether a pillar width number of favorable commit transaction response messages has been received within a commit ACK time period.

When the pillar width number of commit responses has been received, the method continues to step 384 where the processing module issues a plurality of finalize transaction request messages. For example, the processing module sends a finalize transaction request message to each DS unit of the set of DS units, wherein the finalize transaction request message includes a slice name (e.g., a slice name from an associated write request message of each DS unit).

When the pillar width number of commit responses has not been received, the method continues at step 386 where the processing module determines whether a commit threshold number of favorable commit transaction response messages has been received within the commit ACK time period. If not, the method continues on path B; if yet, the method continues on path C.

FIG. 15F is a flowchart illustrating path B from FIG. 15E. Path B begins at step 388 where a processing module identifies each dispersed storage (DS) unit of a set of DS units from which a favorable commit transaction response message was not received. The method continues at step 390 where the processing module sends retry commit transaction request messages to the identified DS units. The method continues at step 392 where the processing module determines whether the commit threshold number of favorable commit transaction response messages has been cumulatively received prior to expiration of a retry commit ACK time period.

When the commit threshold number of favorable commit transaction response messages has been cumulatively received, the method continues at step 396 where the processing module issues a plurality of finalize transaction request messages. When the commit threshold number of favorable commit transaction response messages has not been cumulatively received, the method continues at step 394 where the processing module determines whether a retry threshold has been reached. If not, the method repeats. If yes, the method continues at step 398 where the processing module issues a plurality of undo transaction request messages.

FIG. 15G is a flowchart illustrating path C from FIG. 15E. Path C begins at step 400 where the processing module identifies a dispersed storage (DS) unit from which a favorable commit transaction response message was not received during the commit ACK time period. The method continues at step 402 where the processing module sends a retry commit transaction request message to the identified DS unit. The method continues at step 404 where the processing module determines whether a pillar width number of favorable commit transaction response messages has been cumulatively received prior to expiration of a retry commit ACK time period. If yes, the method continues at step 408 where the processing module issues a plurality of finalize transaction request messages.

When the pillar width number of favorable commit transaction response messages has not been cumulatively received, the method continues to step 406 where the processing module determines whether a retry threshold has been reached. If not, method repeats. If yes, the method continues at step 410 where the processing module records an associated slice name for rebuilding when the retry threshold has been reached. The method continues at step 411 where the processing module issues the plurality of finalize transaction request messages.

Figure 15H:
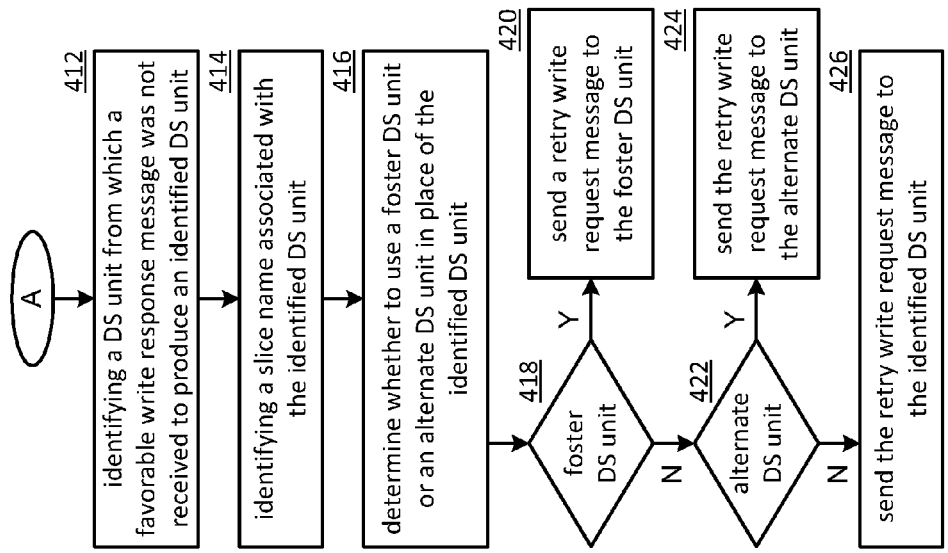
FIG. 15H is another flowchart illustrating another example of storing data in accordance with the present invention.

FIG. 15H is another flowchart illustrating path A from FIG. 15C. Path A begins at step 412 where a processing module identifies a dispersed storage (DS) unit of a set of DS units from which a favorable write response message was not received during a write acknowledgment (ACK) time period to produce an identified DS unit. The method continues at step 414 where the processing module identifies a slice name associated with the identified DS unit.

The method continues at step 416 where the processing module determines whether to execute a retry write process for the identified DS unit, using a foster DS unit for the identified DS unit, or using an alternate DS unit in place of the identified DS unit. Such a determination may be based on one or more of the identified DS unit, the identified slice name, a DS unit error message, a DS unit performance history record, a DS unit status indicator, an estimated DS unit performance level, a lookup, a data type indicator, a data priority indicator, a user identifier, a DS unit identifier, and a message. For example, the processing module determines to execute the retry write process using the foster DS unit when the data priority indicator indicates a high level of priority. In another example, the processing module determines to execute the retry process using the alternate DS unit when the DS unit error message indicates that the identified DS unit is unavailable and the alternate DS unit is available. In another example, the processing module determines to execute the retry process using the identified DS unit when the DS unit status indicator for the identified DS unit indicates that the identified DS unit is available.

The method continues at step 418 where the processing module determines whether to use the foster DS unit as discussed above. If yes, the method continues at step 420 where the processing module sends a retry write request message to the foster DS unit. In this instance, the foster DS unit temporarily stores the encoded data slice(s) on behalf of the identified DS unit and subsequently transfers the encoded data slice(s) to the identified DS unit when it can accept the slice(s).

If not using a foster DS unit, the method continues at step 422 where the processing module determines whether to use the alternate DS unit as discussed above. If not, the method continues at step 426 where the processing module sends the retry write request message to the identified DS unit. If yes, the method continues at step 424 where the processing module sends the retry write request message to the alternate DS unit. In this instance, the indentified DS unit is being replaced in the set with the alternate DS unit.

Figure 15I:
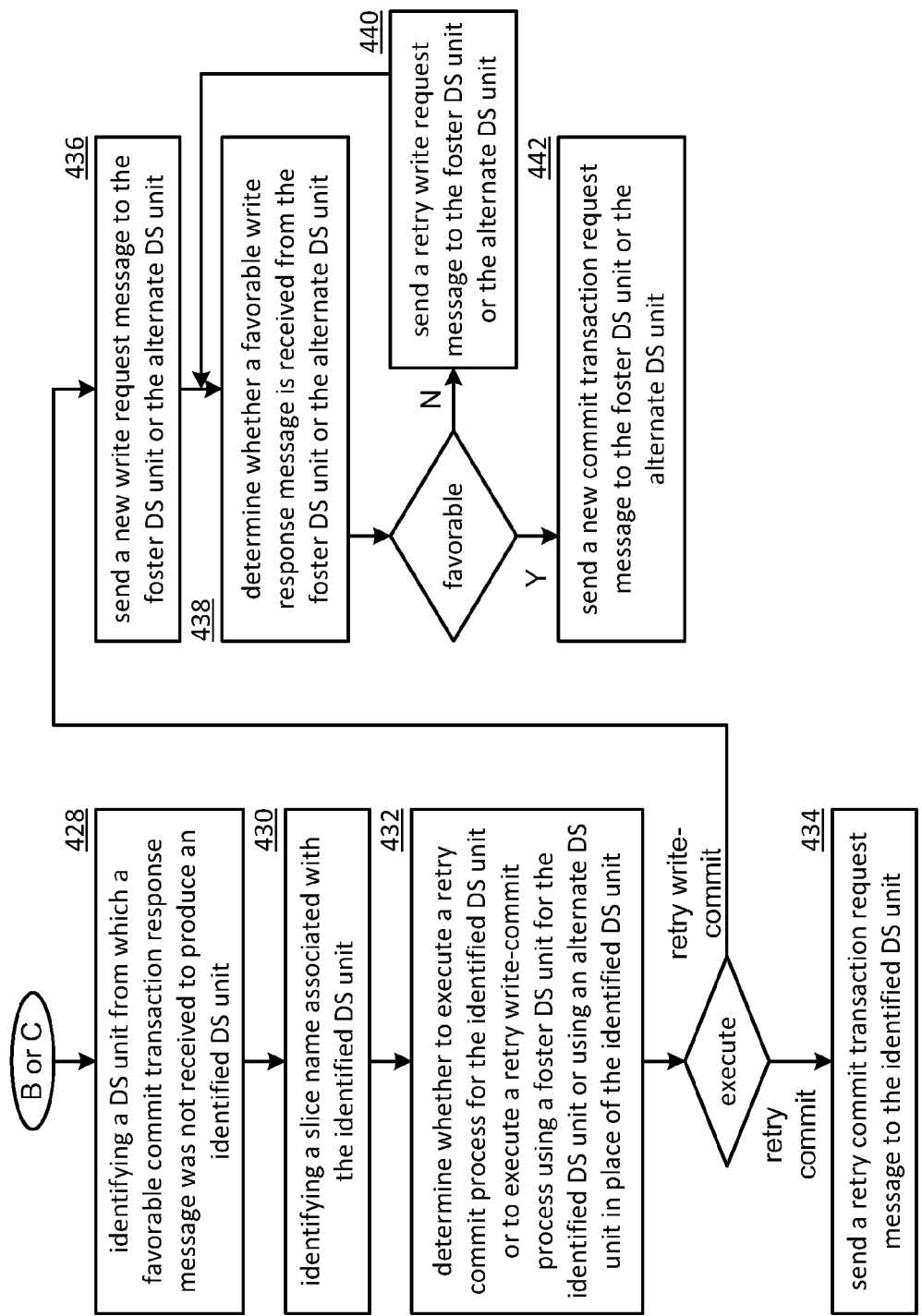
FIG. 15I is another flowchart illustrating another example of storing data in accordance with the present invention.

FIG. 15I is another flowchart illustrating path B and/or C from FIG. 15E. Path B and/or C begins at step 428 where a processing module identifies a dispersed storage (DS) unit of a set of DS units from which a favorable commit transaction response message was not received. The method continues at step 430 where the processing module identifies a slice name associated with the identified DS unit.

The method continues at step 432 where the processing module determines whether to execute a retry commit process for the identified DS unit, to execute a retry write-commit process using a foster DS unit, or to use an alternate DS unit. Such a determination may be based on one or more of the identified DS unit, the identified slice name, a DS unit error message, a DS unit performance history record, a DS unit status indicator, an estimated DS unit performance level, a lookup, a data type indicator, a data priority indicator, a performance goal, a user identifier, a DS unit identifier, and a message. For example, the processing module determines to execute the retry write-commit process using the foster DS unit when the performance goal indicates a longer storage latency time is allowable and an estimated DS unit performance level of the foster DS unit is above a performance threshold. In another example, the processing module determines to execute the retry write-commit process using the alternate DS unit when the data priority indicator indicates a low priority level and a DS unit performance history record associated with the alternate DS unit indicates an average performance level that compares favorably to a performance threshold. In another example, the processing module determines to execute the retry commit process using the identified DS unit when a DS unit error message associated with the identified DS unit indicates that the DS unit is once again available and the performance goal indicates that a longer storage latency time is not allowable.

The method branches to step 436 when the retry write commit process is to be executed. The method continues to step 434 when the retry commit process is to be executed. When the retry commit process is to be executed, the method continues at step 434 where the processing module sends a retry commit transaction request message to the identified DS unit.

When the retry write commit process is to be executed, the method continues at step 436 where the processing module sends a new write request message to the foster DS unit or the alternate DS unit, wherein the new write request message includes an encoded data slice of a set of encoded data slices associated with the identified slice name. The method continues at step 438 where the processing module determines whether a favorable write response message is received from the foster DS unit or the alternate DS unit.

When the favorable response message is not received, the method continues at step 440 where the processing module sends a retry write request message to the foster DS unit or the alternate DS unit and the method repeats at step 438. When the favorable response message is received, the method continues at step 442 where the processing module sends a new commit transaction request message to the foster DS unit or the alternate DS unit.

Figure 16:
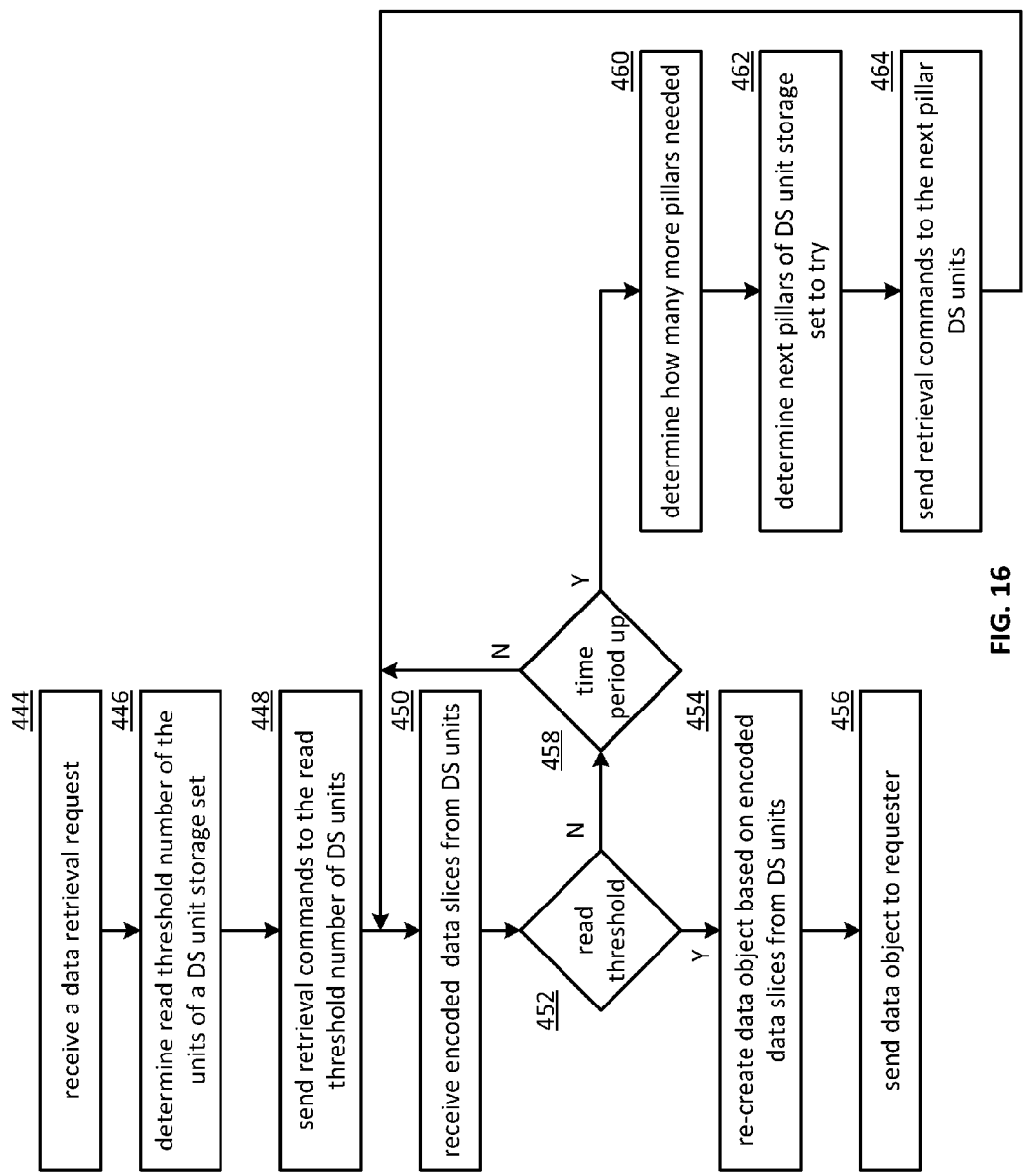
FIG. 16 is another flowchart illustrating another example of retrieving data in accordance with the present invention.

FIG. 16 is a flowchart illustrating another example of retrieving data. The method begins at step 444 where the processing module receiving a data retrieval request. The method continues at step 446 where the processing module determines a read threshold number of DS units. Such determining of the read threshold number of DS units is based on at least one of a read threshold number, a data ID, a user ID, error coding dispersal storage function parameters, a DS unit capability, a DS unit performance history, a DS unit query, a virtual dispersed storage network (DSN) address to physical location table lookup, a list, a vault lookup, a command, a predetermination, a message, a source name, and a slice name. Note that the processing module may determine the read threshold number of DS units to facilitate a desired encoded data slice retrieval response.

For example, the processing module may determine the read threshold number of DS units where the DS unit performance history indicates that the read threshold number of DS units have the lowest expected access latency when the expected access latencies of all of the DS units of the DS unit storage set are ranked against each other. Note that the processing module may determine a preliminary read threshold based on factors previously discussed. Next, the processing module may determine a final read threshold based on the preliminary read threshold and new factors wherein the new factors may include one or more of a predetermined offset, a new requirement, a list, and the message. In an example, the processing module determines the preliminary read threshold to be 12 when the pillar width is 16 and the decode threshold is 10. Next, the processing module determines the final read threshold to be 13 when the predetermined offset is 1.

The method continues at step 448 where the processing module sends read request messages to the read threshold number of DS units. The method continues at step 450 where the processing module receives encoded data slices from the DS units to produce received encoded data slices. The method continues at step 452 where the processing module determines if a number of encoded data slices received within a given time frame compares favorably to the decode threshold number.

When the number of received encoded data slices compares favorably to the decode threshold number, the method continues at step 454 where the processing module dispersed storage error decodes the received encoded data slices to produce data in accordance with the error coding dispersal storage function parameters. The method continues at step 456 where the processing module sends the data to a requester.

When the number of received encoded data slices compares unfavorably to the decode threshold number, the method continues at step 458 where the processing module determines if a time period has expired. The time period may include a dynamic time duration that is based on at least one of a list, a performance indicator (e.g., a shorter time period), and a reliability indicator (e.g., a longer time period). Alternatively, or in addition, the time period may be unique for each DS unit. If the time period has not expired, the method repeats at step 450.

When the time period expires, the method continues at step 460 where the processing module determines an incremental number of encoded data slices (i.e., how many more slices are needed to met the decode threshold) based on the number of received encoded data slices, the decode threshold number, and a goal (e.g., performance and/or availability).

The method continues at step 462 where the processing module determines an incremental number of DS units of the DS unit storage set. Such a determination may be based on one or more of the incremental number of encoded data slices, the received encoded data slices, identifying a previously responding DS unit, identifying a previously non-responding DS unit, identifying a DS unit associated with a timeout indication; identifying a DS unit that was not identified as a DS unit of the read threshold number of DS units of the DS unit storage set, elapsed time since sending the read threshold number of read request messages to the read threshold number of DS units, a comparison of the elapsed time to a total elapsed time threshold, a data ID, a user ID, error coding dispersal storage function parameters, a DS unit capability, a DS unit performance history, a DS unit query, a virtual DSN address to physical location table lookup, a list, a vault lookup, a command, a predetermination, a message, a source name, and a slice name.

The method continues at step 464 where the processing module sends a read request message to each of the incremental number of DS units. In addition, the processing module may reinitialize a timer to enable subsequent determination if elapsed time since sending the read request message to the present time while waiting for received encoded data slices compares favorably to the time period. The method repeats at step 450.

Figure 17A:
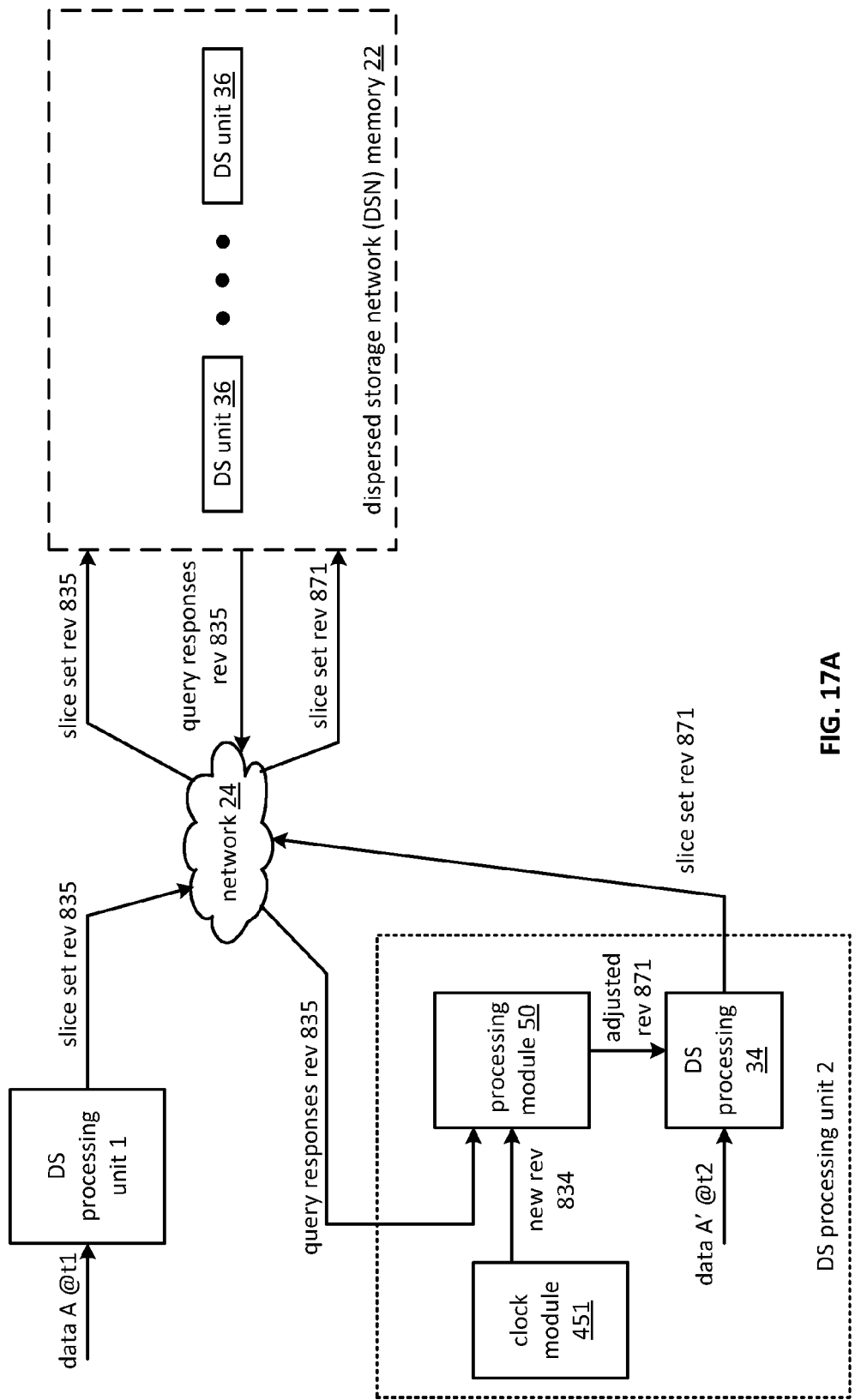
FIG. 17A is a schematic block diagram of another embodiment of a computing system in accordance with the present invention.

FIG. 17A is a schematic block diagram of another embodiment of a computing system that includes two or more dispersed storage (DS) processing units 1-2, the network 24 of FIG. 1, and the dispersed storage network (DSN) memory 22 of FIG. 1. The DSN memory 22 includes a set of DS units 36 of FIG. 1. Hereafter, a DS unit 36 may be interchangeably referred to as a storage unit and the set of DS units 36 may be referred to interchangeably as a set of storage units. Each DS processing unit includes a clock module 451, the processing module 50 of FIG. 2, and the DS processing 34 of FIG. 1. Each DS processing unit may be implemented utilizing the DS processing unit 16 of FIG. 1. The clock module may be implemented utilizing at least a portion of the computing core 26 of FIG. 2.

The computing system is operable to function as a dispersed storage network (DSN). The DSN is operable to synchronize revisions of common data from two or more writers (e.g., the DS processing units 1-2) when writing substantially simultaneously to the DSN memory 22. In an example of operation, the DS processing unit 1, at a first time frame t1, dispersed storage error encodes a data object A to produce a set of slices as a data element associated with a revision value of 835. The revision value for the data element is generated based on a current time of a local clock of a storing device (e.g., local clock of DS processing unit 1). The data element includes a data segment of data object A, where the data segment is dispersed storage error encoded to produce the set of encoded data slices. Having generated the data element and revision value, the DS processing unit 1 sends, via the network 24, the set of slices of revision 835 to the DS units 36 to store the set of encoded data slices in storage units of the DSN.

The DS processing unit 2, at a second timeframe t2, determines to store a currently revised version of the data element in the DSN memory 22 using a new revision value of data object A (e.g., data object A'), where the second timeframe is similar to the timeframe t1 (e.g., milliseconds later). Having determined to store the currently revised version of the data object A, the DS processing unit 2 issues, via the network 24, one or more queries that includes a revision level request to at least one of the storage units and at most each of the storage units of the DSN memory 22 and receives, in response to the revision level request, one or more query responses that include a most current revision value for a data element (e.g., of data object A).

Having received as few as one and as many as a set of responses from the storage units, the processing module 50 determines a current time of the most current revision value based on the one or more responses. For example, the processing module 50 determines the current time of the most current revision value 835.

The clock module 451 outputs a clock value that includes current time of the new revision value. For example, the clock module 451 outputs a new revision value of 834. Having determined the current time of the most current revision value, the processing module 50 compares the current time of the new revision value (e.g., 834) with the current time of the most current revision value (e.g., 835). When the current time of the new revision value succeeds the current time of the most current revision value, the DS processing unit 2 facilitate storage of the currently revised version of the data element having the new revision value. As a specific example, the DS processing 34 dispersed storage error encodes data object A' to produce another set of encoded data slices of the revision value 834 and sends, via the network 24, the other set of encoded data slices to the DSN memory 22 for storage.

When the current time of the new revision value precedes the current time of the most current revision value (e.g., 834 precedes 835), the processing module 50 adjusts the new revision value to produce an adjusted revision value, where the adjusted revision value has an effective current time that succeeds the current time of the most current revision value. As a specific example, the processing module 50 adjusts the new revision value by generating the effective current time by incrementing the current time of the new revision value to a time that exceeds the current time of the most current revision value. For instance, the processing module 50 adjusts the new revision 834 by adding a random number to produce an adjusted revision value of 871. As another specific example, the processing module 50 generates the effective current time by adding a count offset to a current count value of a running count, where the current time of the new revision value is expressed as the current count value and the running count is a measure of time.

Having produced the adjusted revision value, the DS processing unit 2 facilitates storage of the currently revised version of the data element having the adjusted revision value. As a specific example, the DS processing 34 dispersed storage error encodes data object A' to produce the other set of encoded data slices of the adjusted revision 871 and sends, via the network 24, the other set of encoded data slices to the DSN memory 22 for storage.

Figure 17B:
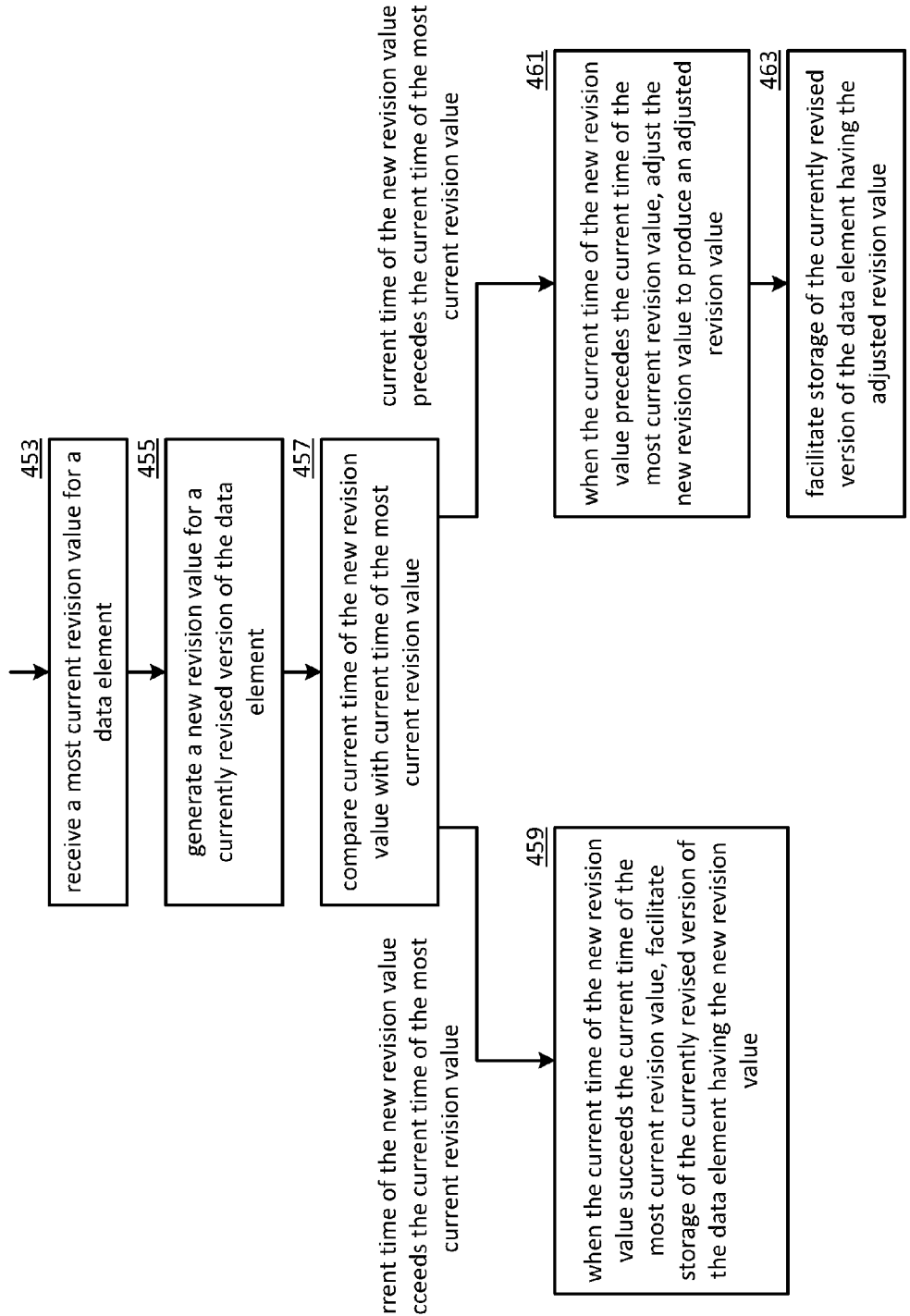
FIG. 17B is a flowchart illustrating an example of determining a revision number in accordance with the present invention.

FIG. 17B is a flowchart illustrating an example of determining a revision number. In particular, a method is presented for use in conjunction with one or more functions and features described in conjunction with FIGS. 1-5, 17A, and also FIG. 17C. The method includes step 453 where a processing module of one or more computing devices of a dispersed storage network (DSN) receives, in response to a revision level request, a most current revision value for a data element, where a revision value for the data element is generated based on a current time of a local clock of a storing device. The data element includes a data segment of a data object, where the data segment is dispersed storage error encoded to produce a set of encoded data slices, and where the set of encoded data slices are stored in storage units of a dispersed storage network. As a specific example, the processing module sends the revision level request to one of the storage units that stores at least one encoded data slice of the set of encoded data slices. As another specific example, the processing module sends the revision level request to each of the storage units. Having sent the revision level request, the processing module receives as few as one and as many as a set of responses from the storage units and determines the current time of the most current version based on at least one and as many as the set of responses.

The method continues at step 455 where the processing module generates a new revision value for a currently revised version of the data element based on a current time of a local clock of the computing device. The method continues at step 457 where the processing module compares the current time of the new revision value with the current time of the most current revision value. When the current time of the new revision value precedes the current time of the most current revision value, the method branches to step 461. When the current time of the new revision value succeeds the current time of the most current revision value, the method continues to step 459. The method continues at step 459 where the processing module facilitates storage of the currently revised version of the data element having the new revision value when the current time of the new revision value succeeds the current time of the most current revision value.

The method continues at step 461 where the processing module adjusts the new revision value to produce an adjusted revision value, where the adjusted revision value has an effective current time that succeeds the current time of the most current revision value when the current time of the new revision value precedes the current time of the most current revision value. As a specific example of the adjusting, the processing module generates the effective current time by incrementing the current time of the new revision value to a time that exceeds the current time of the most current revision value. As another specific example of the adjusting, the processing module generates the effective current time by adding a count offset to a current count value of a running count, where the current time of the new revision value is expressed as the current count value and the running count is a measure of time. The method continues at step 463 where the processing module facilitates storage of the currently revised version of the data element having the adjusted revision value.

The method described above in conjunction with a processing module can alternatively be performed by other modules of a dispersed storage network or by other devices. In addition, at least one memory section that stores operational instructions can, when executed by one or more processing modules of one or more computing devices of a dispersed storage network (DSN), cause the one or more computing devices to perform any or all of the method steps described above.

Figure 17C:
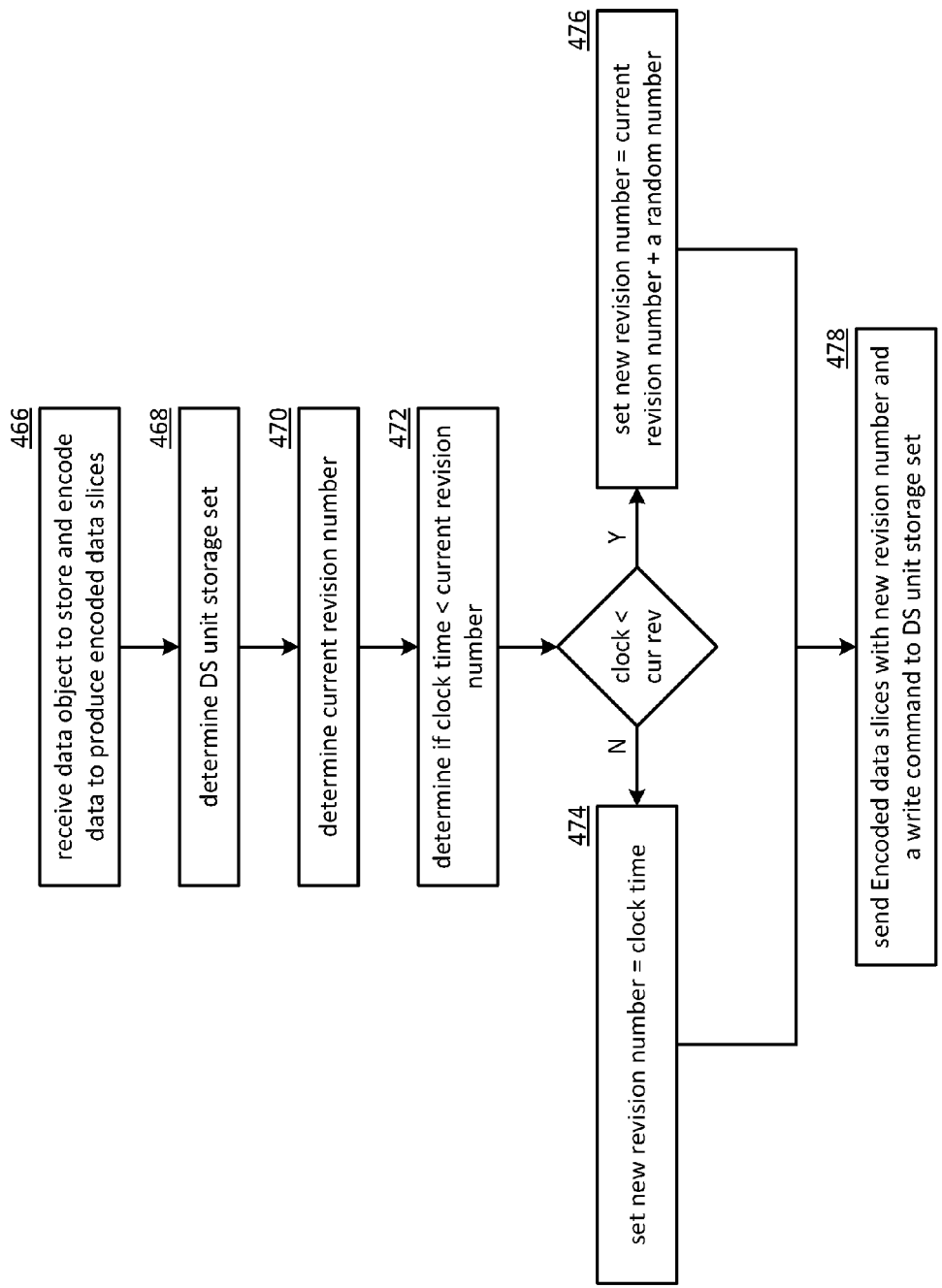
FIG. 17C is a flowchart illustrating another example of determining a revision number in accordance with the present invention.

FIG. 17C is a flowchart illustrating another example of determining a revision number. The method begins at step 466 where a processing module receives a data object (e.g., one or more data segments) and disperse storage error encode it into one or more sets of encoded data slices. The method continues at step 468 where the processing module determines a dispersed storage (DS) unit storage set as previously discussed. The method continues at step 470 where the processing module determines a current revision number of the data object. For example, the processing module retrieves the last stored revision number of the data object from the DSN memory as the current revision number. As another example, the processing module determines the current revision number to be a null value when the data object is not currently stored in the DSN memory. For instance, the current operation is the first time that the data object is being stored in the DSN memory. The determination of the current revision number may be based on one or more of the DS unit storage set, a DS unit storage set query, a list, a vault lookup, a command, a predetermination, a message, operational parameters, and any of the information received in the data object store message.

As yet another example, the processing module may use a system clock to determine a revision number. For instance, the processing module determines that the revision number is equal to clock time (e.g., a timestamp of the clock). Note that two or more DS processing units may attempt to store the same data object to the DSN memory within very similar time periods. Further note that the likelihood that the system clocks of the two or more DS processing units being substantially identical may be low. Note that slight variations in the clocks between two or more DS processing units may result in slices of the same data object revision being stored as two separate revisions in the DSN memory.

The method continues at step 472 where the processing module determines whether the clock time is less than the current revision number based on a comparison of the clock time of the system clock to the current revision number. Note that the clock time may be less than the current revision number when another DS processing unit is attempting to simultaneously store the same data object to the DSN memory and a processing module query to determine the current revision number reveals that the other DS processing unit has already stored slices in the DSN memory with a current revision number that is higher than a clock associated with the processing module when the clock of the other DS processing unit is ahead of the clock associated with the processing module. The method branches to step 476 when the processing module determines that the clock time is less than the current revision number. The method continues to step 474 when the processing module determines that the clock time is not less than the current revision number. The method continues at step 474 where the processing module sets a new revision number equal to the clock time associated with the processing module. The method branches to step 478.

The method continues at step 476 where the processing module sets the new revision number equal to the current revision number plus a random number when the processing module determines that the clock time is less than the current revision number. Note that the new revision number that is greater than the current revision number by way of adding the random number. In an example, the processing module determines the random number based on the output of a random number generator and a method to manipulate the output of the random number generator. For instance, the processing module utilizes a method to manipulate the output of the random number generator such that the resulting random number is a time number between zero and 1 ms in 1 million increments with equal probability. In another instance, the processing module sets the new revision number equal to the current revision number plus a predetermined number (e.g., from a vault lookup, a message, a command, etc.). In another instance, the processing module sets a synchronization error flag that is appended to the new revision number and stored in the DSN memory as described below. In such an instance, a DS processing unit may subsequently utilize the synchronization error flag during a retrieval sequence to determine if a previous clock synchronization error existed such that the current revision number may be expected to be greater than the clock time.

The method continues at step 478 or the processing module sends the encoded data slices and the new revision number with a write request message to the DS unit storage set to facilitate storing the encoded data slices. Note that the processing module may send slices batched by a common pillar number to a corresponding DS unit. For example, the processing module may send substantially all of the encoded data slices for pillar two to DS unit two as a batch message. Note that such a batch message may include one or more of slice names, the new revision number, encoded data slices, a command (e.g., write etc.), a user ID, a password, a security certificate, a data object name, a source name, an ID associated with the DS processing (e.g., a DS processing unit ID), and a DS unit ID. Note that processing module and the DS units may utilize a data storage method such that a write threshold number of DS units store a write threshold number of encoded data slices with the associated new revision number based on the data object as previously discussed.

Figure 18:
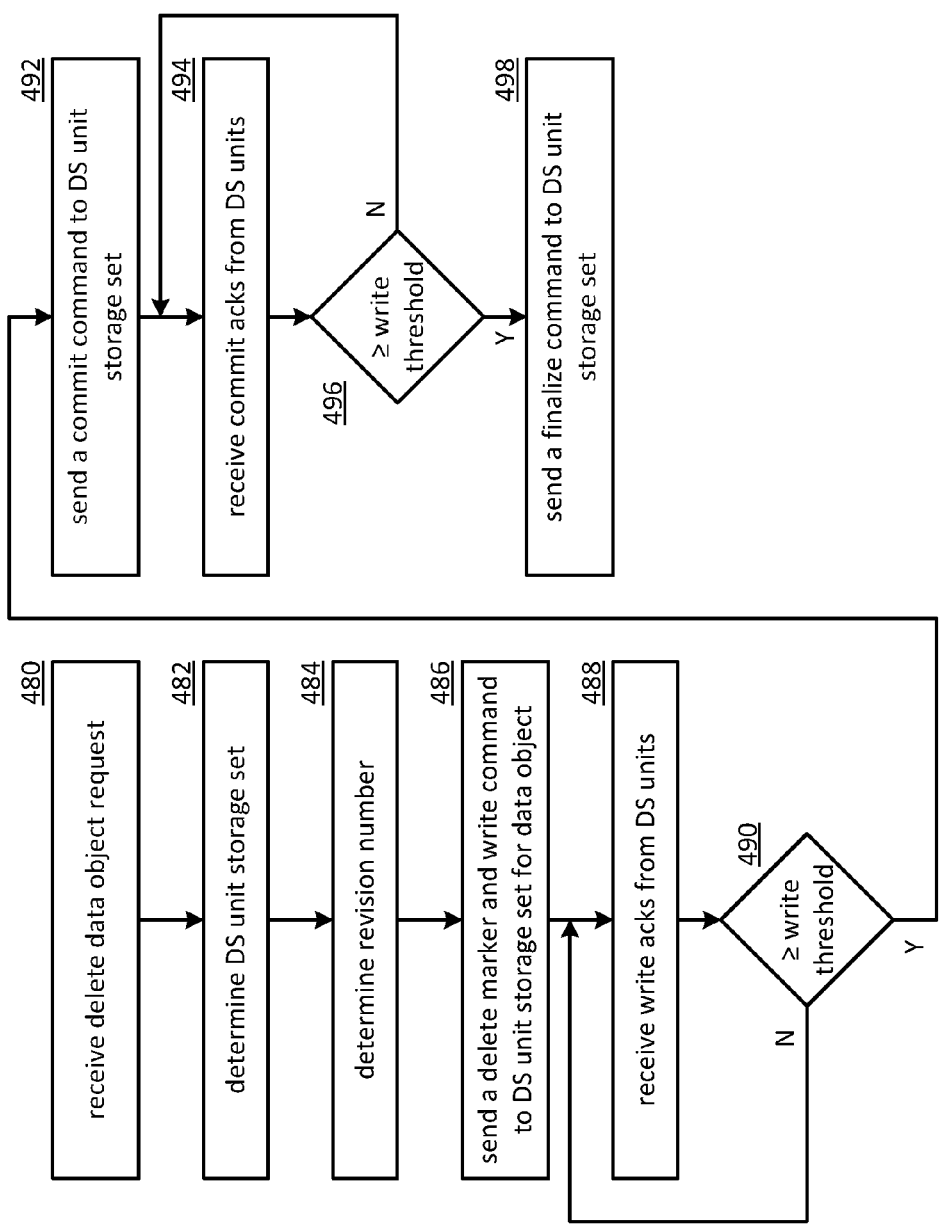
FIG. 18 is a flowchart illustrating an example of deleting data in accordance with the present invention.

FIG. 18 is a flowchart illustrating an example of deleting data. The method begins at step 480 where a processing module receives a delete data object message (e.g., from one of a user device, a dispersed storage (DS) processing unit, a storage integrity processing unit, a DS managing unit, or a DS unit). Such a delete data object message may include one or more of a delete request, a user identifier (ID), a password, a security certificate, a data object name, a revision number, a data type indicator, a data size indicator, a priority indicator, a security indicator, and a performance indicator.

The method continues at step 482 where the processing module determines a DS unit storage set. The method continues at step 484 where the processing module determines a revision number to delete based on one or more of a received revision number, a DS unit storage set query to determine the last revision number, a command, a message, a predetermination, and a list. For example, the processing module determines the revision number to delete based on a received revision number in a delete data object request message. In another example, the processing module determines the revision number to delete based on a query of the DS unit storage set to determine a most recent revision number of the data object.

The method continues at step 486 where the processing module determines a delete marker based on one or more of information in the delete data object request, the operational parameters, the DS unit storage set, the revision number, the data object name, a source name, and slice names. Such a delete marker may include one or more of a data object name, a source name, a slice name, and a revision number. Note that the delete marker may enable a DS unit to subsequently delete the encoded data slices associated with the delete data object request. In an example, the processing module dispersed storage error encodes data (e.g., null data) to produce encoded data slices based on the delete marker in accordance with the operational parameters. In another example, the processing module sends the delete marker directly to each DS unit of the DS unit storage set (e.g., without conversion to encoded data slices).

At step 486, the processing module sends the encoded data slices of the delete marker corresponding to the data object with a write command to the DS unit storage set. The method continues at step 488 where the processing module receives a write acknowledgment from DS units of the DS unit storage set that successfully received the write command and the encoded data slices. The method continues at step 490 where the processing module determines whether a write threshold number of received write acknowledgments has been received within a time period. If not, the method repeats at step 488. Alternatively, the method may end in error when the time period has expired and the write threshold number of received write acknowledgments has not been received.

When the write threshold number of ACKS has been received, the method continues at step 492 where the processing module sends a commit command to the DS unit storage set. The method continues at step 494 where the processing module receives commit acknowledgments from DS units of the DS unit storage set that received the commit command. The method continues at step 496 where the processing module determines whether at least a write threshold number of commit acknowledgments have been received from the DS units within a time period. If not, the method repeats at step 494. Alternatively, the process may end in error when processing module determines that the at least the write threshold number of commit acknowledgments have not been received and the time period has expired.

When a write threshold of commit ACKS have been received, the method continues at step 498 where the processing module sends a finalize command to the DS unit storage set. Note that since the write threshold number of DS units have acknowledged receiving the commit command and have made the new revision of the data object visible to those accessing the DSN memory, the DS units may now delete the previous revision of the same data object from the memory of the DS units in response to receiving a finalize command. The DS units may now delete the encoded data slices of the data object of the delete data object request based on receiving the finalize command.

Figure 19:
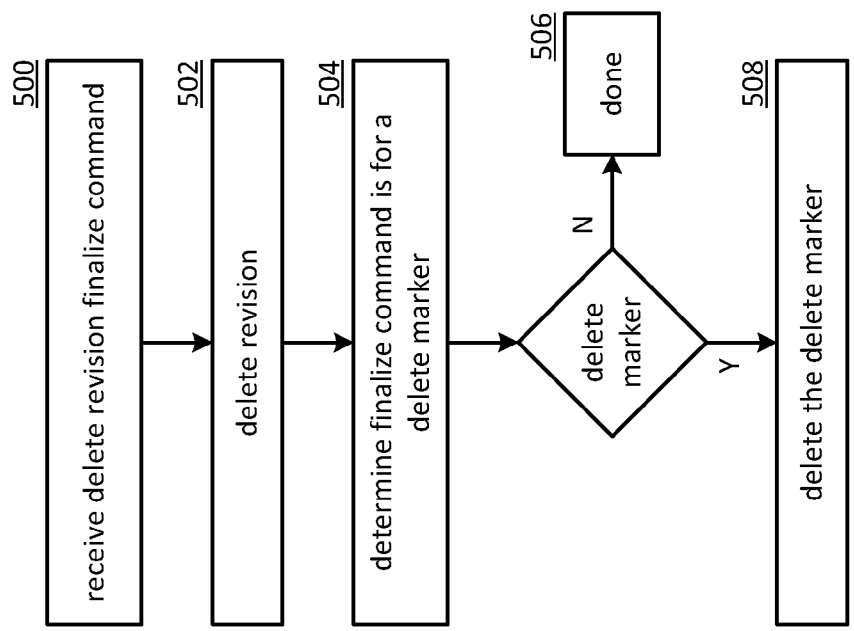
FIG. 19 is another flowchart illustrating another example of deleting data in accordance with the present invention.

FIG. 19 is a flowchart illustrating another example of deleting data. The method begins at step 500 where a processing module (e.g., of a dispersed storage (DS) unit) receives a delete revision finalize command. The delete revision finalize command includes one or more of slice names, encoded data slices, a command (e.g., finalize etc.), a revision number, a user identifier (ID), a password, a security certificate, a data object name, a source name, an ID associated with the processing module (e.g., a DS processing unit ID), and a DS unit ID.

The method continues at step 502 where the processing module determines DS unit memory locations of the encoded data slices to delete based on one or more of information in the finalize command message and a lookup in the local virtual DSN address to physical location table. Next, processing module deletes the encoded data slices associated with the revision.

The method continues at step 504 where the processing module determines whether the finalize command is for a delete marker based on one or more of information received in the finalize command message, a DS unit memory lookup, the revision, and contents of the slices previously stored associated with the delete marker. If not, the method is done (step 506). If yes, the method continues at step 508 where the processing module deletes encoded data slices associated with the delete marker from memory of a DS unit. Note that in this scenario the processing module of the DS unit delete both the encoded data slices of the data object and the encoded data slices of the delete marker.

Figure 20:
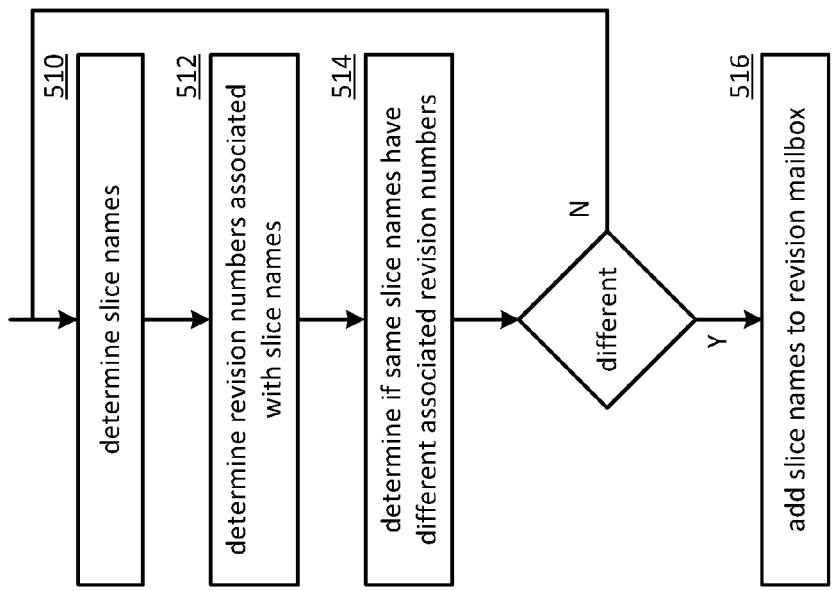
FIG. 20 is a flowchart illustrating an example of determining a slice name in accordance with the present invention.

FIG. 20 is a flowchart illustrating an example of determining a slice name. The method begins at step 510 where a processing module determines slice names associated with stored data in a dispersed storage network (DSN) memory. Note that the slice names may be determined in a range and or by discrete slice names. Such a determination may be based on one or more of a first slice name, where a process left off last time, an error message, a command, a list, and a predetermination.

The method continues at step 512 where the processing module determines revision numbers associated with the slice names. In an instance, only one revision number is associated with the same slice names distributed across the dispersed storage (DS) units of a DS unit storage set. In another instance, multiple revisions are associated with the same slice name stored within each DS unit of the DS unit storage set. The processing module may determine the revision numbers based on one or more of the slice names, a DS unit query (e.g., sending a check request message to the DS units and receiving check response messages) of the revision numbers associated with the slice names, a virtual DSN address to physical location table lookup, and a revision list. For example, the processing module determines the revision numbers associated with slice names by sending a revision number list query request to the DS units. In this instance, the processing module receives a revision number list associating slice names to revision numbers from the DS units. In another example, the processing module constrains the search of slices with different revisions to a single DS unit.

The method continues at step 514 where the processing module determines whether the same slice names (e.g., slices names for the same encoded data segment) have different associated revision numbers based on comparing the revision number list from one DS unit to the other DS units of the DS unit storage set for the same slice names. If the same, the method repeats at step 510.

If different, the method continues at step 516 where the processing module creates a revision mailbox message (e.g., a revisions agent message) which may include one or more of slice names associated with different revision numbers, the revision numbers, a data object name, a data identifier (ID), a user ID, a DS storage set ID and DS unit IDs. The processing module may send the revision mailbox message to a revision agent mailbox such that a revision agent may subsequently correct the errors.

Figure 21:
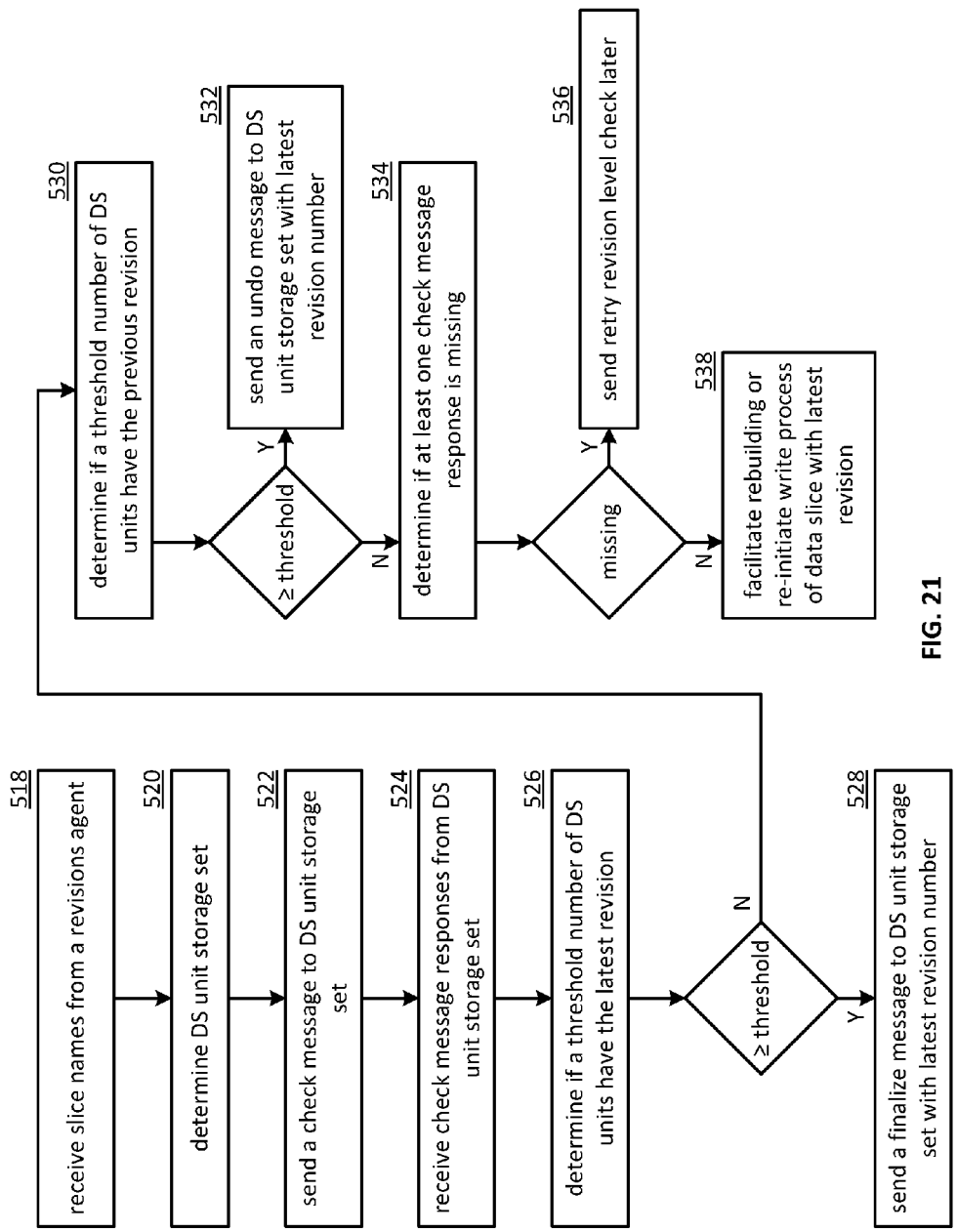
FIG. 21 is a flowchart illustrating an example of aligning revision numbers in accordance with the present invention.

FIG. 21 is a flowchart illustrating an example of aligning revision numbers. The method begins at step 518 where the processing module receives a revision agent message from a revisions agent. Such a revision agent message includes one or more of one or more slice names, at least one revision number, a latest revision number, a previous revision number, a data object name, a data identifier (ID), a revisions agent ID, a user ID, a dispersed storage (DS) storage set ID, and one or more DS unit IDs.

The method continues at step 520 where the processing module determines DS units that are storing a set of encoded data slices associated with a data segment. The method continues at step 522 where the processing module sends a revision level check request message to each of the DS units. The revision level check request message includes a slice name associated with the data segment. The method continues at step 524 where the processing module receives revision level check response messages from at least some of the DS units within a time period. Such a revision level check response message includes at least one of a revision count, a revision level number, and a slice length associated with the slice name of the data segment.

The method continues at step 526 where the processing module determines concurrency of a revision level of the set of encoded data slices stored by the DS units based on the received revision level check response messages. Such a determination may be based on comparing revision levels of each of the revision level check response messages. Note that the revision level may include a latest revision level (e.g., a most recently stored revision). For example, the processing module determines concurrency when a revision level of 4 is received from DS unit 5, the revision level of 4 is received from DS unit 6, and revision level 4 is the latest revision level. Next, the processing module determines whether a number of DS units with a concurrent revision level of a set of encoded data slices is at least a threshold number (e.g., a write threshold). For example, the processing module determines that at least a threshold number of encoded data slices have concurrency of the revision level when 14 DS units indicate revision 4 of the encoded data slice is stored in each of the 14 DS units and the threshold is 12.

When at least a threshold number of DS units have concurrent revision levels, the method continues at step 528 where the processing module sends a write finalize message to each of the DS units. The write finalize message includes the revision level and a slice name of a corresponding one of the set of encoded data slices (e.g., the slice name associated with the revision level check) when at least the threshold number of encoded data slices have concurrency of the revision level. Note that a DS unit may request an encoded data slice associated with the revision level when receiving the write finalize message for the revision level wherein the revision level is unknown to the DS unit (e.g., not already stored in the DS unit). Further note that this may provide a system reliability and performance improvement by facilitating storage of encoded data slices of the same revision to the DS units. Alternatively, or in addition to, the processing module may send the write finalize message to each of the DS units, wherein the write finalize message includes the revision level and the slice name of the corresponding one of the set of encoded data slices when at least the threshold number, but less than a pillar width number, of encoded data slices have concurrency of the revision level. In such a scenario, at least one DS unit does not have the encoded data slice associated with the revision level.

When less than a threshold number of DS units have concurrency of a current revision level, the method continues at step 530 where the processing module determines whether the threshold number of encoded data slices have concurrency of a previous revision level (e.g., a revision level prior to the latest revision level). If yes, the method continues at step 532 where the processing module sends an undo transaction request message to each of the DS units. The undo transaction request message includes the latest revision level and a slice name of a corresponding one of the set of encoded data slices when at least the threshold number of encoded data slices has concurrency of the previous revision level. In this instance, most of the DS units did not store the latest revision of the data segment and thus have an undesired previous revision. As such, the DS units delete the encoded data slices associated with the latest revision, if they have them, and make the previous revision the current revision of the encoded data segment.

When less than a threshold number of DS units have concurrency of a previous revision level, the method continues at step 534 where the processing module determines whether the revision level check response message has been received from each of the DS units. If yes, the continues to step 536 where the processing module sends a retry revision level check request message to one or more of the DS units. The retry revision level check request message includes the slice name (e.g., the slice name associated with the revision level check). Note that the processing module may wait a time period prior to sending the retry revision level check request message.

If all DS units have responded at step 534, the method continues at step 538 where the processing module initiates a rebuilding process (e.g., sending the slice name associated with the revision level check to a rebuilding agent) or a re-write process (e.g., sending the encoded data slice and the slice name associated with the revision level check to the DS unit for storage therein). In an example, the processing module initiates the rebuilding process to rebuild the revision to a full pillar width prior to sending a finalize command. Note that the DS unit may delete slices associated with previous revisions when receiving the finalize command.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention.

The present invention has been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein.

The present invention has been described above with the aid of functional building blocks illustrating the performance of certain significant functions. The boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

What is claimed is:

1. A method for execution by a computing device, the method comprises:

receiving, from another computing device within a dispersed storage network (DSN) via a communication interface of the computing device and at processing hardware of the computing device, in response to a revision level request, a most current revision value for a data element, wherein a revision value for the data element is generated based on a current time of a local clock of a storing device that is implemented within the DSN to store at least one encoded data slice (EDS) of a set of encoded data slices (EDSs) that are distributedly stored in storage units of the DSN, wherein the data element including a data segment of a data object, wherein the data segment is dispersed storage error encoded to produce the set of EDSs, wherein a threshold number of EDSs of the set of EDSs are needed to recover the data segment;

generating, by the processing hardware of the computing device, a new revision value for a currently revised version of the data element based on a current time of a local clock of the computing device;

comparing, by the processing hardware of the computing device, the current time of the new revision value with the current time of the most current revision value; and when the current time of the new revision value precedes the current time of the most current revision value:

adjusting, by the processing hardware of the computing device, the new revision value to produce an adjusted revision value, wherein the adjusted revision value has an effective current time that succeeds the current time of the most current revision value; and sending the currently revised version of the data element having the adjusted revision value to the storing device that is implemented within the DSN including sending at least one other EDS of another set of EDSs to be distributedly stored in the storage units of the DSN, wherein the currently revised version of the data element including another data segment, wherein the another data segment is dispersed storage error encoded to produce the another set of EDSs, wherein the threshold number of EDSs of the another set of EDSs are needed to recover the another data segment.

2. The method of claim 1 further comprises:

when the current time of the new revision value succeeds the current time of the most current revision value, sending the currently revised version of the data element having the new revision value to the storing device.

3. The method of claim 1, wherein the adjusting comprises:

generating the effective current time by incrementing the current time of the new revision value to a time that exceeds the current time of the most current revision value.

4. The method of claim 1, wherein the adjusting comprises:

generating the effective current time by adding a count offset to a current count value of a running count, wherein the current time of the new revision value is expressed as the current count value and the running count is a measure of time.

5. The method of claim 1 further comprises:

sending the revision level request to one of the storage units that stores the at least one encoded data slice of the set of EDSs.

6. The method of claim 1 further comprises:
sending the revision level request to each of the storage units;
receiving a set of responses from the storage units; and
determining the current time of the most current version based on the set of responses.

7. A non-transitory computer readable storage medium comprises:
at least one memory section that stores operational instructions that, when executed by one or more processing modules of one or more computing devices of a dispersed storage network (DSN), causes the one or more computing devices to:
receive, from another computing device within the dispersed storage network (DSN) via a communication interface of the one or more computing devices and in response to a revision level request, a most current revision value for a data element, wherein a revision value for the data element is generated based on a current time of a local clock of a storing device that is implemented within the DSN to store at least one encoded data slice (EDS) of a set of encoded data slices (EDSs) that are distributedly stored in storage units of the DSN, wherein the data element including a data segment of a data object, wherein the data segment is dispersed storage error encoded to produce the set of EDSs, wherein a threshold number of EDSs of the set of EDSs are needed to recover the data segment;
generate a new revision value for a currently revised version of the data element based on a current time of a local clock of a computing device of the one or more computing devices;
compare the current time of the new revision value with the current time of the most current revision value; and
when the current time of the new revision value precedes the current time of the most current revision value:
adjust the new revision value to produce an adjusted revision value, wherein the adjusted revision value has an effective current time that succeeds the current time of the most current revision value; and
sending the currently revised version of the data element having the adjusted revision value to the storing device that is implemented within the DSN including sending at least one other EDS of another set of EDSs to be distributedly stored in the storage units of the DSN, wherein the currently revised version of the data element including another data segment, wherein the another data segment is dispersed storage error encoded to produce the another set of EDSs, wherein the threshold number of EDSs of the another set of EDSs are needed to recover the another data segment.

8. The non-transitory computer readable storage medium of claim 7 further comprises:
the at least one memory section stores further operational instructions that, when executed by the one or more processing modules, causes the one or more computing devices of the DSN to:
when the current time of the new revision value succeeds the current time of the most current revision value, sending the currently revised version of the data element having the new revision value to the storing device.

9. The non-transitory computer readable storage medium of claim 7, wherein the one or more processing modules functions to execute the operational instructions stored by the at least one memory section to cause the one or more computing devices of the DSN to adjust the new revision value by:
generating the effective current time by incrementing the current time of the new revision value to a time that exceeds the current time of the most current revision value.

10. The non-transitory computer readable storage medium of claim 7, wherein the one or more processing modules functions to execute the operational instructions stored by the at least one memory section to cause the one or more computing devices of the DSN to adjust the new revision value by:
generating the effective current time by adding a count offset to a current count value of a running count, wherein the current time of the new revision value is expressed as the current count value and the running count is a measure of time.

11. The non-transitory computer readable storage medium of claim 7 further comprises:
the at least one memory section stores further operational instructions that, when executed by the one or more processing modules, causes the one or more computing devices of the DSN to:
send the revision level request to one of the storage units that stores the at least one EDS encoded data slice of the set of EDSs.

12. The non-transitory computer readable storage medium of claim 7 further comprises:
the at least one memory section stores further operational instructions that, when executed by the one or more processing modules, causes the one or more computing devices of the DSN to:
send the revision level request to each of the storage units;
receive a set of responses from the storage units; and
determine the current time of the most current version based on the set of responses.

13. A computing device comprises:
an interface;
a clock module that generates a clock value; and
a processing module operably coupled to the interface and the clock module, wherein the processing module includes processing hardware and functions to:
receive, from another computing device within a dispersed storage network (DSN) via the interface in response to a revision level request, a most current revision value for a data element, wherein a revision value for the data element is generated based on a current time of a local clock of a storing device that is implemented within the DSN to store at least one encoded data slice (EDS) of a set of encoded data slices (EDSs) that are distributedly stored in storage units of the DSN, wherein the data element including a data segment of a data object, wherein the data segment is dispersed storage error encoded to produce the set of EDSs, wherein a threshold number of EDSs of the set of EDSs are needed to recover the data segment;
generate a new revision value for a currently revised version of the data element based on a current time from the clock value of the clock module;
compare the current time of the new revision value with the current time of the most current revision value; and
when the current time of the new revision value precedes the current time of the most current revision value:
adjust the new revision value to produce an adjusted revision value, wherein the adjusted revision value has an effective current time that succeeds the current time of the most current revision value; and sending the currently revised version of the data element having the adjusted revision value to the storing device that is implemented within the DSN including sending at least one other EDS of another set of EDSs to be distributedly stored in the storage units of the DSN, wherein the currently revised version of the data element including another data segment, wherein the another data segment is dispersed storage error encoded to produce the another set of EDSs, wherein the threshold number of EDSs of the another set of EDSs are needed to recover the another data segment.

14. The computing device of claim 13, wherein the processing module further functions to:

when the current time of the new revision value succeeds the current time of the most current revision value, sending the currently revised version of the data element having the new revision value to the storing device.

15. The computing device of claim 13, wherein the processing module functions to adjust the new revision value by:

generating the effective current time by incrementing the current time of the new revision value to a time that exceeds the current time of the most current revision value.

16. The computing device of claim 13, wherein the processing module functions to adjust the new revision value by:

generating the effective current time by adding a count offset to a current count value of a running count, wherein the current time of the new revision value is expressed as the current count value and the running count is a measure of time.

17. The computing device of claim 13, wherein the processing module further functions to:

send, via the interface, the revision level request to one of the storage units that stores the at least one EDS encoded data slice of the set of EDSs.

18. The computing device of claim 13, wherein the processing module further functions to:

send, via the interface, the revision level request to each of the storage units;

receive, via the interface, a set of responses from the storage units; and determine the current time of the most current version based on the set of responses.

* * * * *